United States Patent [19]

Athanas et al.

[11] Patent Number: 5,016,908

[45] Date of Patent: May 21, 1991

[54] METHOD AND APPARATUS FOR CONTROLLING SHOCK ABSORBERS

[75] Inventors: David S. Athanas, Toledo, Ohio; Gary W. Groves, Monroe; Fahrey M. Hammoud, Woodhaven, both of Mich.; David L. Perry, Sylvania, Ohio

[73] Assignee: Monroe Auto Equipment Company, Monroe, Mich.

[21] Appl. No.: 322,774

[22] Filed: Mar. 13, 1989

[51] Int. Cl.[5] .......................................... B60G 17/01
[52] U.S. Cl. .................................... 280/707; 280/714; 364/424.05; 188/299
[58] Field of Search .................. 280/714, 707, DIG. 1, 280/840; 267/64.25; 364/424.05; 188/299

[56] References Cited

U.S. PATENT DOCUMENTS

| | | | |
|---|---|---|---|
| 4,065,154 | 12/1977 | Glaze | 188/288 |
| 4,333,668 | 6/1982 | Hendrickson et al. | 280/707 |
| 4,505,988 | 3/1985 | Urano et al. | 419/27 |
| 4,638,896 | 1/1987 | Poyser | 188/299 |
| 4,671,392 | 6/1987 | Wössner | 188/299 |
| 4,743,046 | 5/1988 | Schnittger | 280/707 |

FOREIGN PATENT DOCUMENTS

| | | | |
|---|---|---|---|
| 1505417 | 6/1965 | Fed. Rep. of Germany | 188/299 |
| WO87/1075-65 | 12/1987 | PCT Int'l Appl. | 280/707 |
| 1308509 | 5/1987 | U.S.S.R. | 280/707 |

Primary Examiner—Charles A. Marmor
Assistant Examiner—Karin Tyson
Attorney, Agent, or Firm—Harness, Dickey & Pierce

[57] ABSTRACT

An apparatus for damping the movement of the body of an automobile. The apparatus includes a shock absorber having a pressure cylinder which forms a working chamber and a first and second portion. A first sensor is used to generate an electrical signal in response to the pressure differential between the damping fluid stored in the first and second portions of the working chamber. A second sensor is used for determining the movement of the body on the automobile. An electrical control module is used for generating an electrical control signal in response to the outputs of the first and second sensors. Finally, the solenoid is used for regulating the flow of damping fluid between the first and second portions of the working chamber.

63 Claims, 14 Drawing Sheets

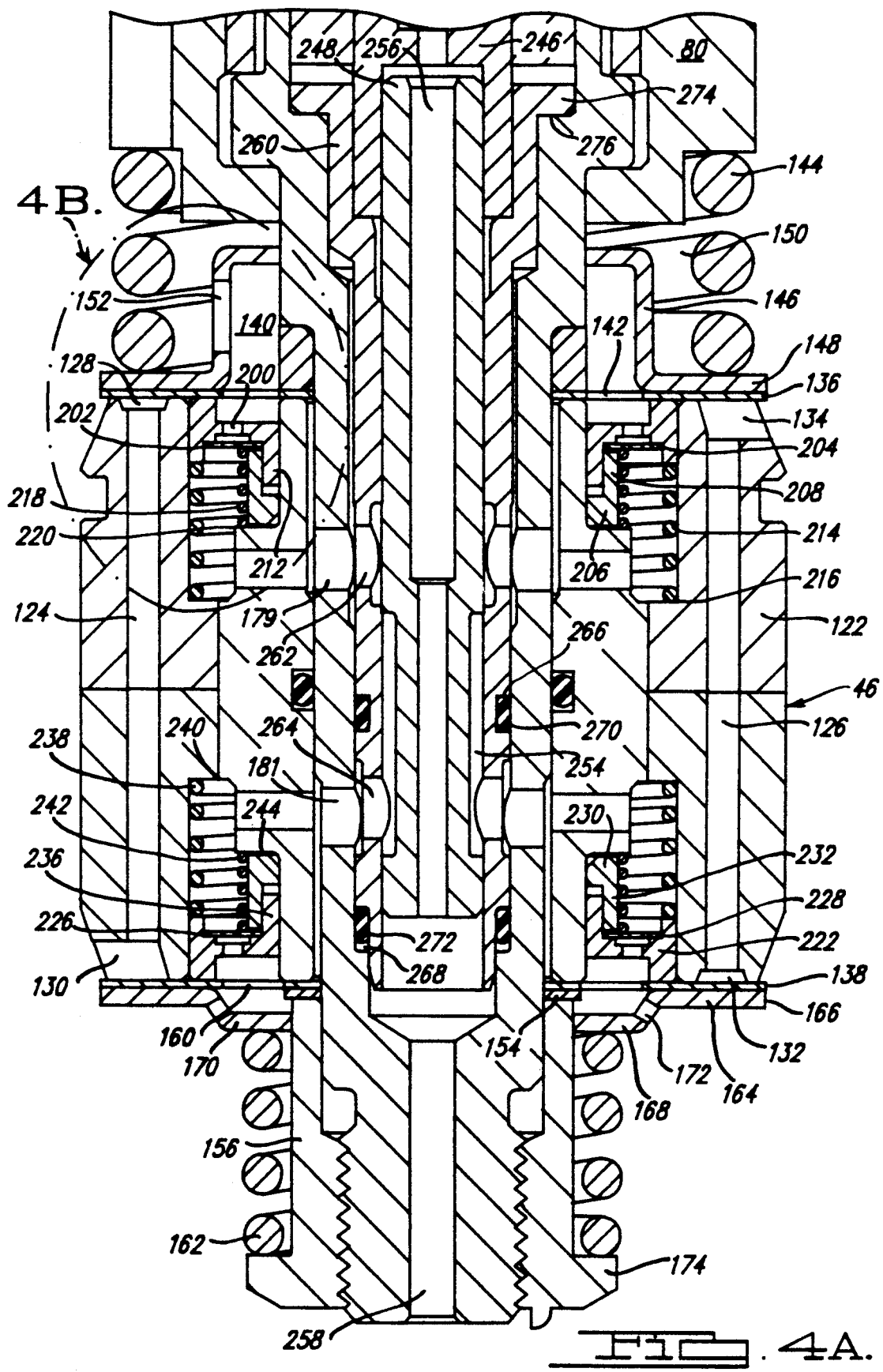

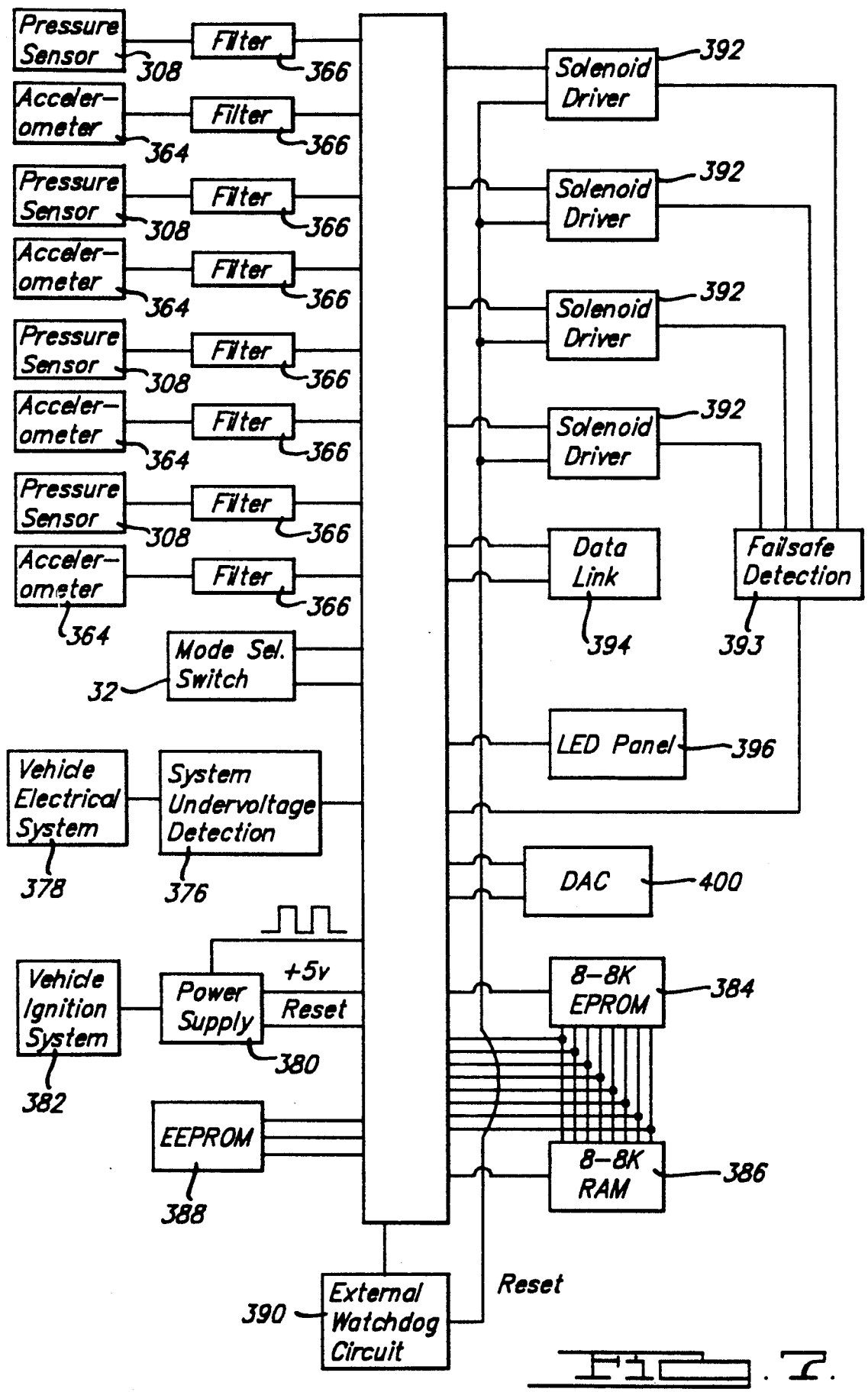

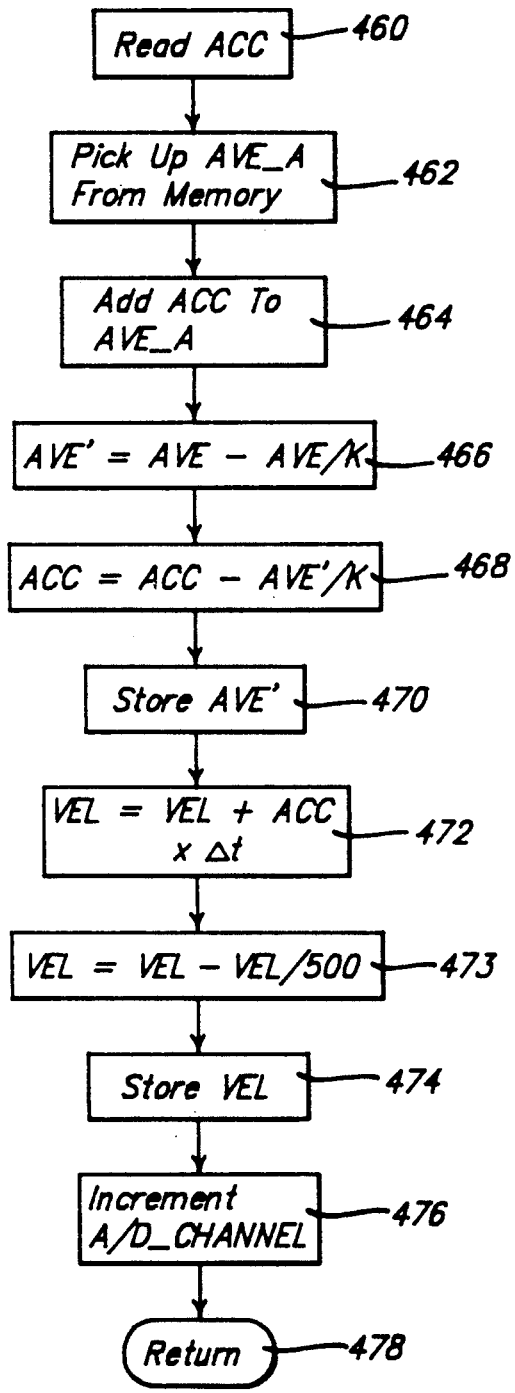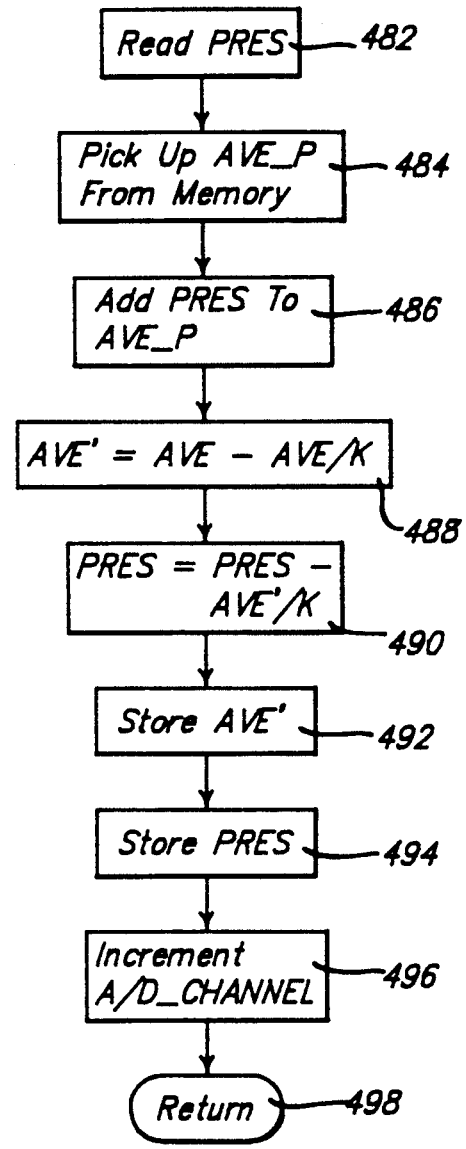
FIG. 10.
FIG. 11.

METHOD AND APPARATUS FOR CONTROLLING SHOCK ABSORBERS

BACKGROUND OF THE INVENTION

1. Field of the Invention

This invention relates to suspension systems for automobiles and machines which receive mechanical shock, and more particularly to a method and apparatus for controlling shock absorbers.

2. Description of Related Art

Shock absorbers are used in connection with automotive suspension systems to absorb unwanted vibrations which occur during driving. To dampen unwanted vibrations, shock absorbers are generally connected between the body and the suspension of the automobile. A piston assembly is located within the shock absorber and is connected to the body of the automobile through a piston rod. Because the piston assembly is able to limit the flow of damping fluid within the working chamber of the shock absorber when the shock absorber is compressed or extended, the shock absorber is able to provide a damping force which "smooths" or "dampens" vibrations transmitted from the suspension to the body.

The greater the degree to which the flow of damping fluid within the working chamber is restricted by the piston assembly, the greater the damping forces which are provided by the shock absorber. Accordingly, a "soft" compression and rebound stroke is produced when the flow of damping fluid in the working chamber is relatively unrestricted. In contrast, a "firm" compression and rebound stroke is produced when there is an increased restriction in the flow of damping fluid in the working chamber.

In selecting the amount of damping that a shock absorber is to provide, three vehicle performance characteristics are often considered: ride comfort, vehicle handling and road holding ability. Ride comfort is often a function of the spring constant of the main springs of the vehicle, as well as the spring constant of the seat, tires, and the damping of the shock absorbers. Vehicle handling is related to the variation in the vehicle's attitude (i.e., roll, pitch and yaw). For optimum vehicle handling, relatively large damping forces are required to avoid excessively rapid variation in the vehicle's attitude during cornering, acceleration, and deceleration. Road holding ability is generally a function of the amount of contact between the tires and the ground. To optimize road holding ability, large damping forces are required when driving on irregular surfaces to prevent loss of contact between the wheels and the ground for an excessive period of time.

Because different driving characteristics depend on the amount of damping forces the shock absorber provides, it is often desirable to have a shock absorber in which the amount of damping forces generated by the shock absorber is adjustable. One method for selectively changing the damping characteristics of a shock absorber is disclosed in European Patent Application Publication No. 0 186 908 A2. In European Patent Application Publication No. 0 186 908 A2, a controller detects the distance between the body of the automobile and the front wheel so as to determine the contour of the surface. A rotary valve in each of the rear shock absorbers is then adjusted so that the rear shock absorbers are able to provide the desired amount of damping forces.

Another method for selectively changing the damping characteristics of a shock absorber is disclosed in PCT International Publication No. WO 88/06983. In PCT International Publication No. WO 88/06983, the shock absorber has a solenoid which controls the flow of damping fluid into pressure chambers which are located adjacent to valve disks which control the damping characteristics of the shock absorber. Upon movement of the plunger of the solenoid, the pressure in these pressure chambers changes so that the damping characteristics of the shock absorber may be varied.

SUMMARY OF THE INVENTION

Accordingly, it is the primary object of the present invention to provide a method and apparatus for controlling shock absorbers in which the amount of damping fluid flowing between the upper and lower portions of the working chamber may be controlled with a relatively high degree of accuracy and speed. A related object of the present invention is to provide a method and apparatus for controlling shock absorbers in which the amount of damping forces provided by the shock absorber can be adjusted with a relatively high degree of accuracy and speed.

Another object of the present invention is to provide a method and apparatus for controlling shock absorbers in which movement of the components of the solenoid which is used to control the damping forces is reduced. In this regard, a related object of the present invention is to provide a method and apparatus for controlling shock absorbers in which the plunger of a solenoid may be held in one position to produce both a firm compression stroke as well as a firm rebound stroke.

A further related object of the present invention is to provide a method and apparatus for controlling shock absorbers in which the plunger of a solenoid may be held in one position to produce both a soft compression stroke as well as a soft rebound stroke.

Another object of the present invention is to provide a method and apparatus for controlling shock absorbers in which the occurrence of a compression or rebound stroke may be determined by measuring the pressure differential between the damping fluid in the upper and lower portions of the working chamber (i.e., the pressure difference across the piston of the shock absorber).

A related object of the present invention is to provide a method and apparatus for controlling shock absorbers in which damping characteristics of the shock absorber are determined in part by the output of an accelerometer.

A further object of the present invention is to provide a method and apparatus for controlling shock absorbers in which the sensors used for controlling damping characteristics may be disposed within a shock absorber.

Another object of the present invention is to provide a method and apparatus for controlling shock absorbers in which the flow of damping fluid through the shock absorber is unidirectional. In this regard, a related object of the present invention is to provide method and apparatus for controlling shock absorbers in which a base valve limits flow of damping fluid to one direction.

A further object of the present invention is to provide a method and apparatus for controlling shock absorbers which is relatively inexpensive yet is able to accurately control the damping forces provided by the shock absorber.

BRIEF DESCRIPTION OF THE DRAWINGS

Other objects of the present invention will become apparent to one skilled in the art upon reading the following specification and by reference to the following drawings in which:

FIGS. 4A, 4B and 4C are cross-sectional views of the piston assembly and the lower portion of the piston post shown in FIG. 2;

FIG. 7 is a block diagram illustrating the electronic control module which is used for controlling the shock absorber shown in FIG. 2;

FIG. 10 is a flow chart of the CALC_VEL routine which is used by the microprocessor shown in FIG. 8 for controlling the shock absorber shown in FIG. 2;

FIG. 11 is a flow chart of the PRESSURE routine which is used by the microprocessor shown in FIG. 8 for controlling the shock absorber shown in FIG. 2;

DESCRIPTION OF THE PREFERRED EMBODIMENT

Figure 1:
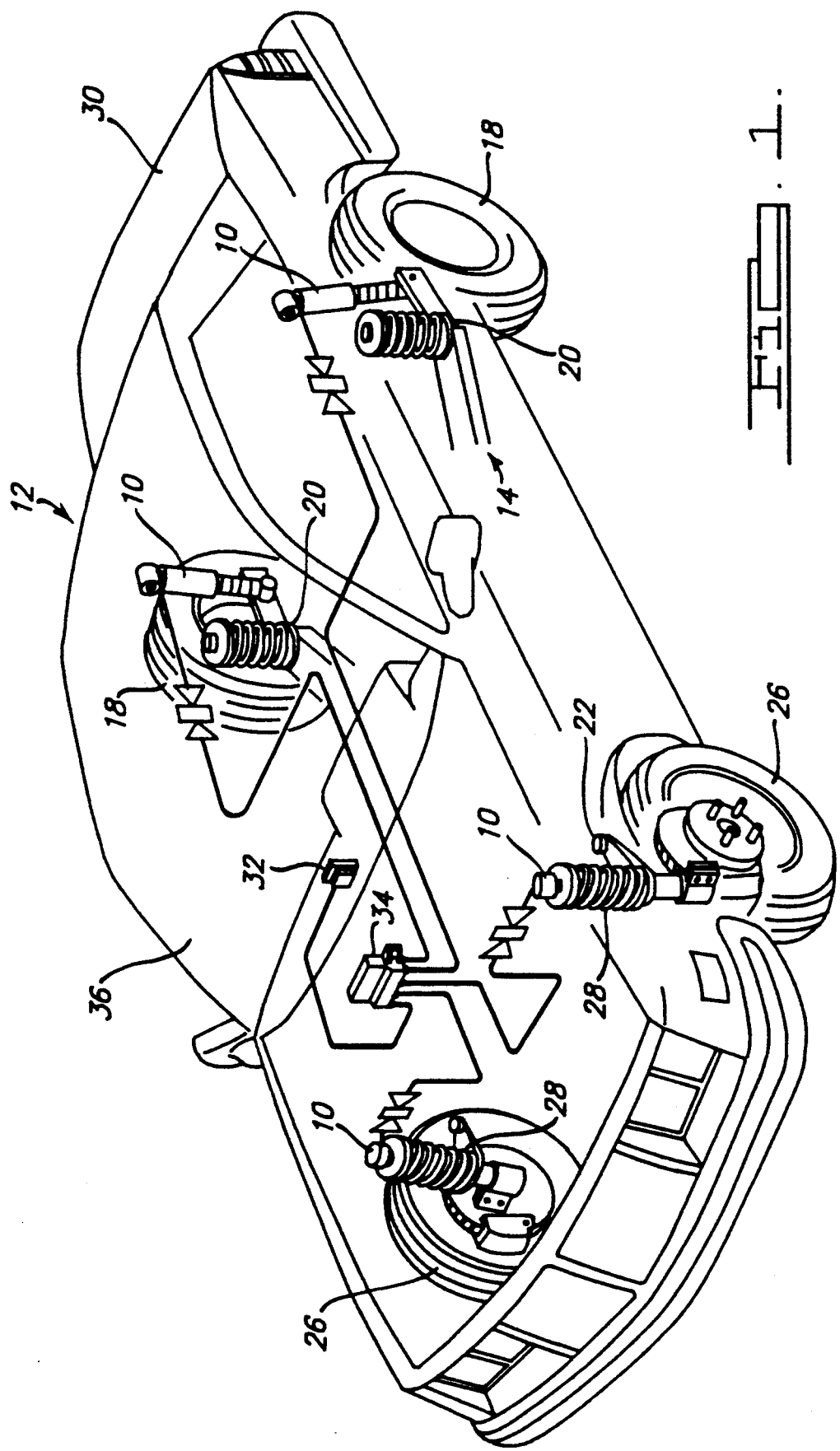
FIG. 1 is an illustration of an automobile using the method and apparatus for controlling shock absorbers according to the teachings of the preferred embodiment of the present invention.

Referring to FIG. 1, a plurality of four shock absorbers 10 according to the preferred embodiment of the present invention are shown. The shock absorbers 10 are depicted in operative association with a diagrammatic representation of a conventional automobile 12. The automobile 12 includes a rear suspension system 14 having a transversely extending rear axle assembly (not shown) adapted to operatively support the vehicle's rear wheels 18. The rear axle assembly is operatively connected to the automobile 12 by means of a pair of shock absorbers 10 as well as by the helical coil springs 20. Similarly, the automobile 12 has a front suspension system 22 including a transversely extending front axle assembly (not shown) to operatively support the front wheels 26. Front axle assembly is operatively connected to the automobile 12 by means of a second pair of shock absorbers 10 and by the helical coil springs 28. The shock absorbers 10 serve to damp the relative movement of the unsprung portion (i.e., the front and rear suspension systems 22 and 14) and the sprung portion (i.e., the body 30) of the automobile 12. While the automobile 12 has been depicted as a passenger car, the shock absorber 10 may be used with other types of automotive vehicles or in other types of applications. Further, the term "shock absorber" as used herein will refer to shock absorbers in the general sense of the phrase and will include MacPherson struts. In addition, the shock absorbers may be used with other types of suspension systems as well.

To allow the damping characteristics of the shock absorbers 10 to be controlled, a mode select switch 32 and an electronic control module 34 are provided. The mode select switch 32 is located within the passenger compartment 36 of the automobile 12 and is accessible by the occupants of the automobile 12. The mode select switch 32 is used for selecting which type of damping characteristics the shock absorbers 10 are to provide (i.e., firm, soft or automatic). The electronic control module 34 receives the output from the mode select switch 32 and is used for generating electronic control signals for controlling damping characteristics of the shock absorbers 10. By controlling the damping characteristics of the shock absorbers 10, the shock absorbers 10 are able to dampen relative movement between the body 30 and the suspension of the automobile 12 in such a manner as to optimize both ride comfort and road handling ability simultaneously.

Figure 2:
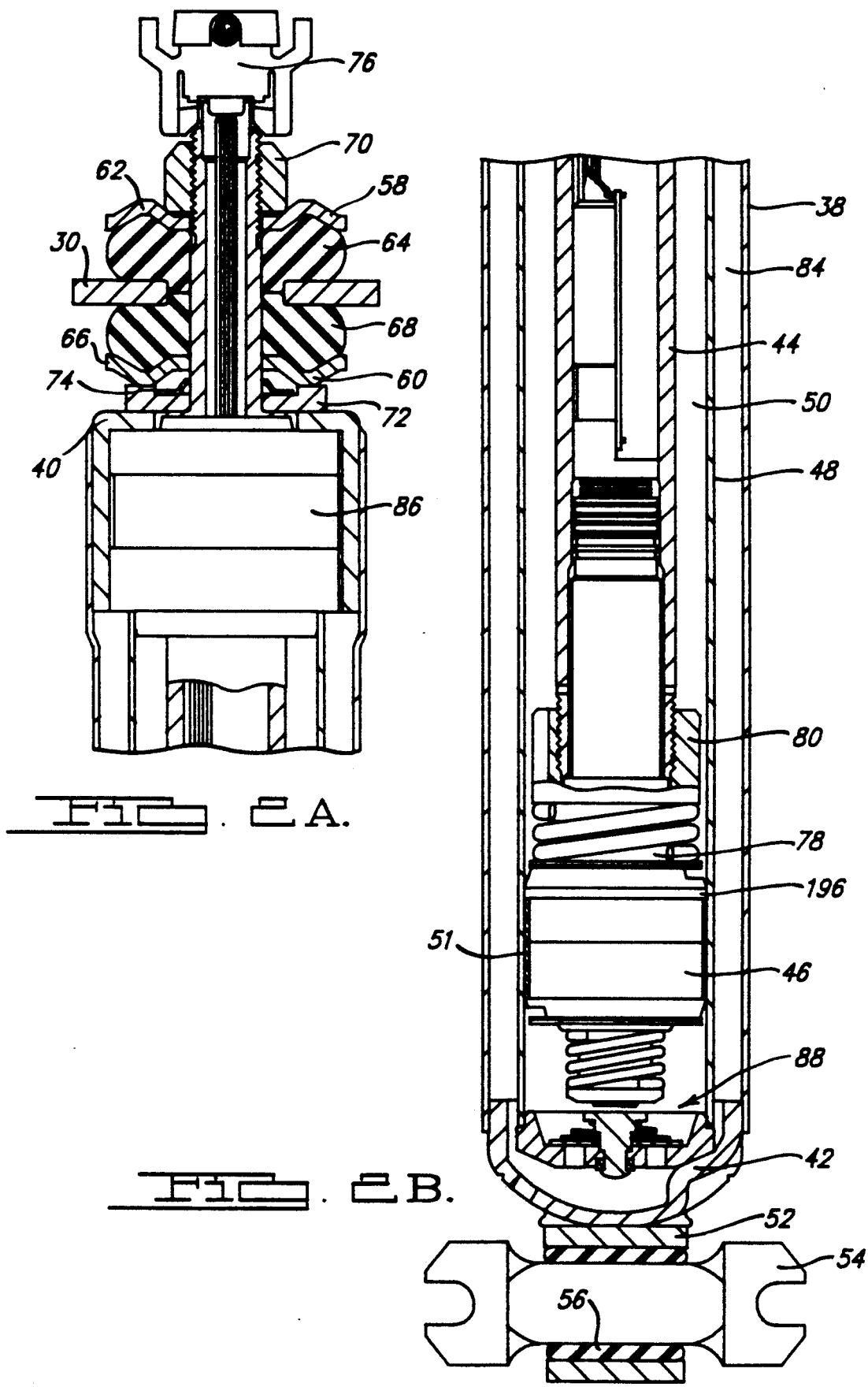
FIGS. 2A and 2B is the schematic representation of the shock absorber using the method and apparatus for controlling shock absorbers according to the teachings of the preferred embodiment of the present invention.

The structure of the shock absorbers 10 will now be described with reference to FIG. 2. The shock absorber 10 comprises an elongated reserve tube 38 which engages a cup-shaped oil cap 40 at the upper end of the reserve tube 38. The reserve tube 38 also engages a base cup 42 at the lower end of the reserve tube 38 so as to form a chamber which is able to store damping fluid. Extending axially through the oil cap 40 is a piston rod 44 which is secured to a reciprocating piston assembly 46 at the lower end of the piston rod 44. The piston assembly 46 is axially displaceable within an elongated tubular pressure cylinder 48 which is disposed within the reserve tube 38. The pressure cylinder 48 defines a working chamber 50 in which the upper portion of the working chamber 50 is located above the piston assembly 46, while the lower portion of the working chamber 50 is located below the piston assembly 46. Disposed between the piston assembly 44 and the pressure cylinder 48 is a teflon sleeve 51 which is used to facilitate movement of the piston assembly 46 with respect to pressure cylinder 48.

To connect the shock absorber 10 to the rear axle assembly of the automobile 12, the shock absorber 10 comprises a circular end fitting 52. The circular end fitting 52 is secured to the base cup 42 of the shock absorber 10 by a suitable means such as welding. Within the circular end fitting is disposed a mounting pin 54 disposed within a bushing 56 which is adapted to engage the axle assembly of the automobile 12. To connect the shock absorber 10 to the body 30 of the automobile 12, a first retainer 58 and a second retainer 60 are provided. The first retainer 58 and the second retainer 60 are disk shaped and have a central aperture operable to receive the piston rod 44. The first retainer 58 is disposed above the body 30, while the second retainer 60 is disposed below the body 30. The first retainer 58 has an upwardly facing annular indentation 62 which is able to accommodate a first disk-shaped cushion 64 which is disposed between the body 30 of the automobile 12 and the first retainer 58. Similarly, the second retainer 60 has a downwardly facing annular indentation 66 which is operable to receive a second disk-shaped cushion 68 which is disposed between the body 30 of the automobile 12 and the second retainer 60.

The shock absorber 10 further comprises a self-locking nut 70 which is disposed on the piston rod 44 immediately above the first retainer 58. The self-locking nut 70 has an internally threaded bore which is able to threadably engage the threaded upper end portion of the piston rod 44. Accordingly, by rotating the self-locking nut 70 on the upper portion of the piston rod 44, both the first retainer 58 and the first cushion 64 are displaced in a direction toward the body 30 of the automobile 12.

The second retainer 60 is positionally secured in part by means of an annular spacer 72 which is disposed immediately above the oil cap 40. The spacer 72 has a central bore which is able to receive the upper end portion of the piston rod 44. A pal nut 74 is disposed between the second retainer 60 and the spacer 72. The pal nut 74 is generally disk shaped and has a central bore which is able to receive the piston rod 44. The pal nut 74 is used to locate and secure the spacer 72.

Figure 8:
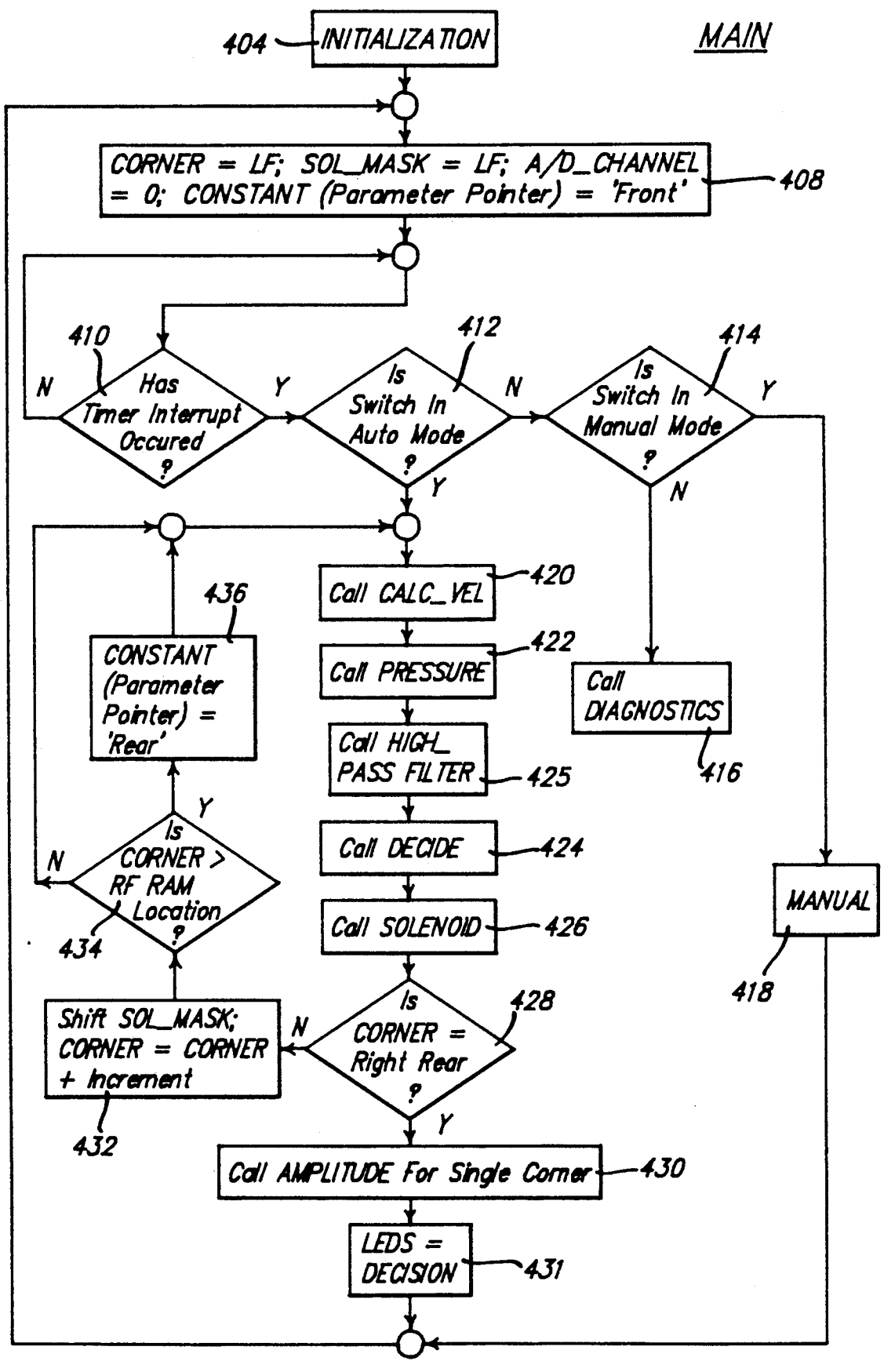
FIG. 8 is a flow chart illustrating the MAIN routine which is used by the microprocessor shown in FIG. 7 for controlling the operation of the shock absorber shown in FIG. 2.
Figure 9:
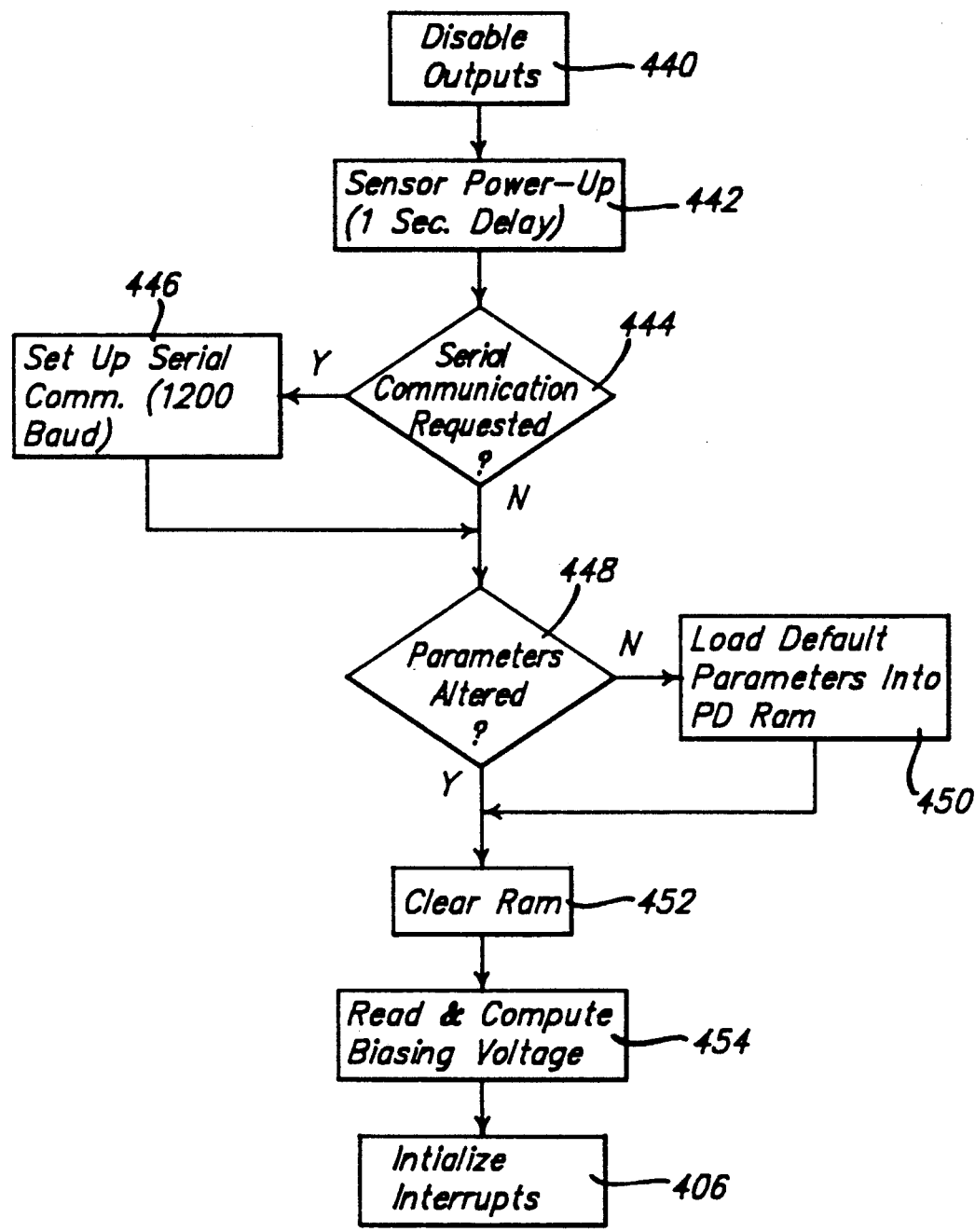
FIG. 9 is a flow chart of the INITIALIZATION portion of the MAIN routine which is used by the microprocessor shown in FIG. 8 for controlling the shock absorber shown in FIG. 2.

To permit electrical communication between the electronic control module 34 and the coil described below, the shock absorber 10 further comprises an electrical connector assembly 76. The electrical connector assembly 76 allows for rapid electrical decoupling of the shock absorber 10 from the electronic control module 34 so that the shock absorber 10 may be replaced. The electrical connector assembly 76 may be of the type which is shown in FIGS. 8-10 of U.S. Ser. No. 105,404 filed on Oct. 5, 1987, though other suitable electrical connectors may be used.

To support the piston assembly 46 on the piston rod 44, an axially extending piston post 78 and a piston post rod nut 80 are provided. The piston post 78 is generally circular in cross-section and extends axially through the central bore 82 (see FIG. 5) of the piston assembly 46. The piston post 78 is secured to the piston rod 44 by the piston post rod nut 80. The piston post rod nut 80 is annularly shaped and comprises an internally threaded bore which is able to mate with the externally threaded lower portion of the piston rod 44.

To support the piston rod 44 within the working chamber 50 as well as to provide unidirectional flow of damping fluid through the damping fluid reservoir 84, a rod guide/valve assembly 86 is provided. The rod guide/valve assembly 86 allows fluid flow during compression of the shock absorber 10, while preventing the flow of damping during rebound of the shock absorber 10. The rod guide/valve assembly 86 may be of the type which is shown and described in conjunction with FIG. 10 of U.S. Ser. No. 07/322,542, filed Mar. 18, 1989, which is hereby incorporated by reference. However, it is to be understood that other suitable rod guide/valve assemblies may be used.

Figure 3:
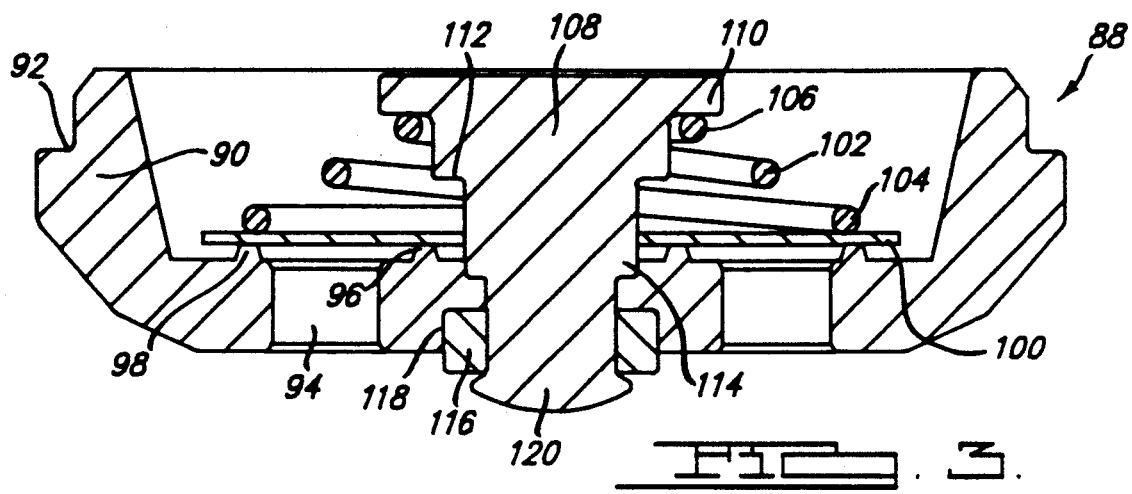
FIG. 3 is a cross-sectional view of the base valve shown in FIG. 2.

To allow damping fluid in the damping fluid reservoir 84 to flow into the working chamber 50, a base valve assembly 88 is provided as shown in FIG. 3. The base valve assembly 88 allows damping fluid to flow from the damping fluid reservoir 84 into the lower portion of the working chamber 50 during rebound. However, the base valve assembly 88 prevents the flow of damping fluid from the lower portion of the working chamber 50 to the damping fluid reservoir 84 through the base valve assembly 88 during compression. The base valve assembly 88 comprises a generally cup-shaped pressure cylinder end portion 90 which is disposed coaxially with, and adjacent to, the lower portion of the pressure cylinder 48. The end portion 90 contains a peripherally upwardly disposed recess 92 which is operable to engage the lower portion of the pressure cylinder 48. The pressure cylinder 48 is secured to the recess 92 by a suitable means such as a press fit.

The pressure cylinder end portion 90 comprises six upwardly disposed flow passages 94 which permit damping fluid to flow through the pressure cylinder end portion 90. The base valve assembly 88 further comprises first and second upwardly disposed annular projections 96 and 98 which are disposed on the upper surface of the pressure cylinder end portion 90. The upwardly disposed annular projection 96 extends coaxially with the axial center line of the pressure cylinder end portion 90 and resides adjacent to the radially inwardmost edge of the flow passages 94. Similarly, the upwardly disposed annular projection 98 extends coaxially with respect to the axial center line of the pressure cylinder end portion 90 and is adjacent to the radially outwardmost edge of the flow passages 94.

The flow of damping fluid through the flow passages 94 is regulated by an intake disk 100. The intake disk 100 is located perpendicular to the axial center line of the pressure cylinder end portion 90. Furthermore, the intake disk 100 rests on the upwardly disposed annular projections 96 and 98 when no damping fluid is flowing through the flow passages 94. Accordingly, the intake disk 100 is able to prevent the flow of damping fluid through the flow passages 94 while the intake disk 100 rests on the upwardly disposed annular projections 96 and 98.

To bias the intake disk 100 against the upwardly disposed annular projections 96 and 98, the base valve assembly 88 also comprises a tapered helical intake spring 102. The intake spring 102 is disposed coaxially with the axial center line of the pressure cylinder end portion 90, with the lower portion 104 of the intake spring 102 resting against the upper surface of the intake disk 100. The diameter of the lower portion 104 of the intake spring 102 is larger than the diameter of the upper portion 106 of the intake spring 102 so that the lower portion 104 of the intake spring 102 extends proximate to the radially outwardmost periphery of the intake disk 100. Because the lower portion 104 of the intake spring 102 biases the intake disk 100 against the upwardly disposed annular projections 96 and 98, damping fluid is able to flow through the flow passages 94 only when the force exerted by the damping fluid in the flow passages 94 is large enough to overcome the biasing force provided by the intake spring 102.

To secure the upper end of the intake spring 102 within the base valve assembly 88, the base valve assembly 88 further comprises a base valve pin 108. The base valve pin 108 extends through and is disposed coaxially with the axial center line of the pressure cylinder end portion 90. The base valve pin 108 also extends through a central aperture in the intake disk 100 so that the base valve pin 108 can prevent lateral movement of the intake disk 100. The upper portion of the base valve pin 108 includes a first flange portion 110 which extends perpendicularly with respect to the axial center line of the base valve pin 108. The upper surface of the intake spring 102 rests on the lower surface of the first flange portion 110 so as to secure the intake spring 102 within the base valve assembly 88.

The base valve pin 108 further comprises a second flange portion 112 and a third flange portion 114. Because the second flange portion 112 extends a greater radial distance than the central aperture of the intake disk 100 through which the base valve pin 108 extends, the flange portion 112 may limit upward movement of the intake disk 100. The third flange portion 114 extends a greater radial distance than the aperture of the pressure cylinder end portion 90 through which the base valve pin 108 extends. Accordingly, the third flange portion 114 limits downward movement of the base valve pin 108 with respect to the pressure cylinder end portion 90.

Upward movement of the base valve pin 108 is limited by an annular base valve insert 116 which is disposed within a central annular recess 118 on the lower surface of the pressure cylinder end portion 90. The base valve insert 116 is disposed coaxially with the axial center line of the base valve pin 108 and is disposed on the radial periphery of the base valve pin 108. Because the lower portion of the base valve pin 108 has a deformed head portion 120 having a greater radial diameter than the internal diameter of the base valve insert 116, the base valve insert 116 prevents upward movement of the base valve pin 108 with respect to the pressure cylinder end portion 90.

The piston assembly 46 will now be described in greater detail with reference to FIGS. 4A, 4B and 4C. The piston assembly 46 is used for controlling the flow of damping fluid between the upper and lower portions of the working chamber 50. The piston assembly 46 comprises a valve body 122 having a first and second plurality of vertical flow passages 124 and 126. Each of the flow passages 124 comprises a valve controlled upper outlet end portion 128 and a lower counter-recessed inlet end portion 130. Similarly, each of the flow passages 126 comprise a valve controlled lower outlet end portion 132 and an upper counter-recessed inlet end portion 134.

To allow the piston assembly 46 to regulate the flow of damping fluid between the upper and lower portions of the working chamber 50, an upper spring disk 136 and a lower spring disk 138 are provided. The upper spring disk 136 is disposed adjacent to the upper outlet end portion 128 of the flow passages 124, as well as the upper inlet end portion 134 of the flow passages 126. In addition, the upper surface of the spring disk 136 is adjacent to an annular spacer 140 which is coaxially disposed on the periphery of the piston post 78. Accordingly, the spacer 140 and the piston assembly 46 prevent movement of the radially inward portion of the upper spring disk 136. The upper spring disk 136 further has a flow passage 142 which allows damping fluid to flow therethrough which is used to bias the spring disks 136 and 138 in a manner described below.

To place a biasing force on the upper surface of the upper spring disk 136, a first helical valve spring 144 and a annularly shaped spring seat 146 are provided. The spring seat 146 has a radially extending portion 148 as well as an axially extending portion 150. The radially extending portion 148 is disposed adjacent to the upper surface of the upper spring disk 136 and extends from the outer radial surface of the flow passage 142 to the radially outer edge of the upper spring disk 136. The axially extending portion 150 of the spring seat 146 extends from the radially extending portion 148 in an axially direction to a position immediately below the piston post rod nut 80. The axially extending portion 150 further comprises a flow passage 152 which allows damping fluid in the upper portion of the working chamber 50 to flow therethrough so as to provide the necessary biasing forces in the manner described below.

The helical valve spring 144 is disposed between the piston post rod nut 80 and the upper surface of the radially extending portion 148 of the spring seat 146. Since the valve spring 144 is in compression, the valve spring 144 forces the radially extending portion 148 of the spring seat 146 against the upper surface of the spring disk 136, which in turn forces the lower surface of the spring disk 136 against the upper outlet end portion 128 of the vertical flow passages 124.

The lower spring disk 138 is disposed adjacent to the lower surface of the piston assembly 46 adjacent to the lower outlet end portion 132 of the vertical flow passages 126 as well as the lower inlet end portion 130 of the vertical flow passages 124. The lower spring disk 138 is upwardly secured by the upper surface of the valve body 122, and is downwardly secured by a disk-shaped spacer 154 which is disposed coaxially above a piston nut 156 which threadably engages the externally threaded lower end portion of the piston post 78. Accordingly, the inner radial periphery of the lower spring disk 138 is secured between the spacer 154 and the valve body 122 by the piston nut 156. The lower spring disk 138 comprises a flow passage 160 which allows damping fluid in the lower portion of the working chamber 50 to flow therethrough. As will be described more thoroughly below, damping fluid flowing through the flow passage 160 is used for varying the biasing force applied to the upper spring disk 136 and thus the valve spring 144.

To provide biasing forces on the outer periphery of the lower spring disk 138, a second valve spring 162 and a spring seat 164 are provided. The spring seat 164 comprises a first radially extending portion 166 as well as a second radially extending portion 168. The first radially extending portion 166 is disposed coaxially above the second radially extending portion 168 and is connected thereto by the step portion 170. The step portion 170 further has a flow passage 172 which allows damping fluid to flow therethrough in a manner described below.

The second valve spring 162 is disposed adjacent to the outer periphery of the upper portion of the piston nut 156 with the upper surface of the valve spring 162 resting on the lower surface of the second radially extending portion 168 of the spring seat 164. The lower surface of the valve spring 162 rests on the upper surface of a radially extending flange portion 174 of the piston post 78. Because the valve spring 162 is in compression, the valve spring 162 places an upward biasing force on the spring seat 164 which places an upwardly directed biasing force on the lower spring disk 138. Accordingly, the lower spring disk 138 is able to limit the flow of damping fluid flowing through the flow passages 126 during rebound.

Figure 5:
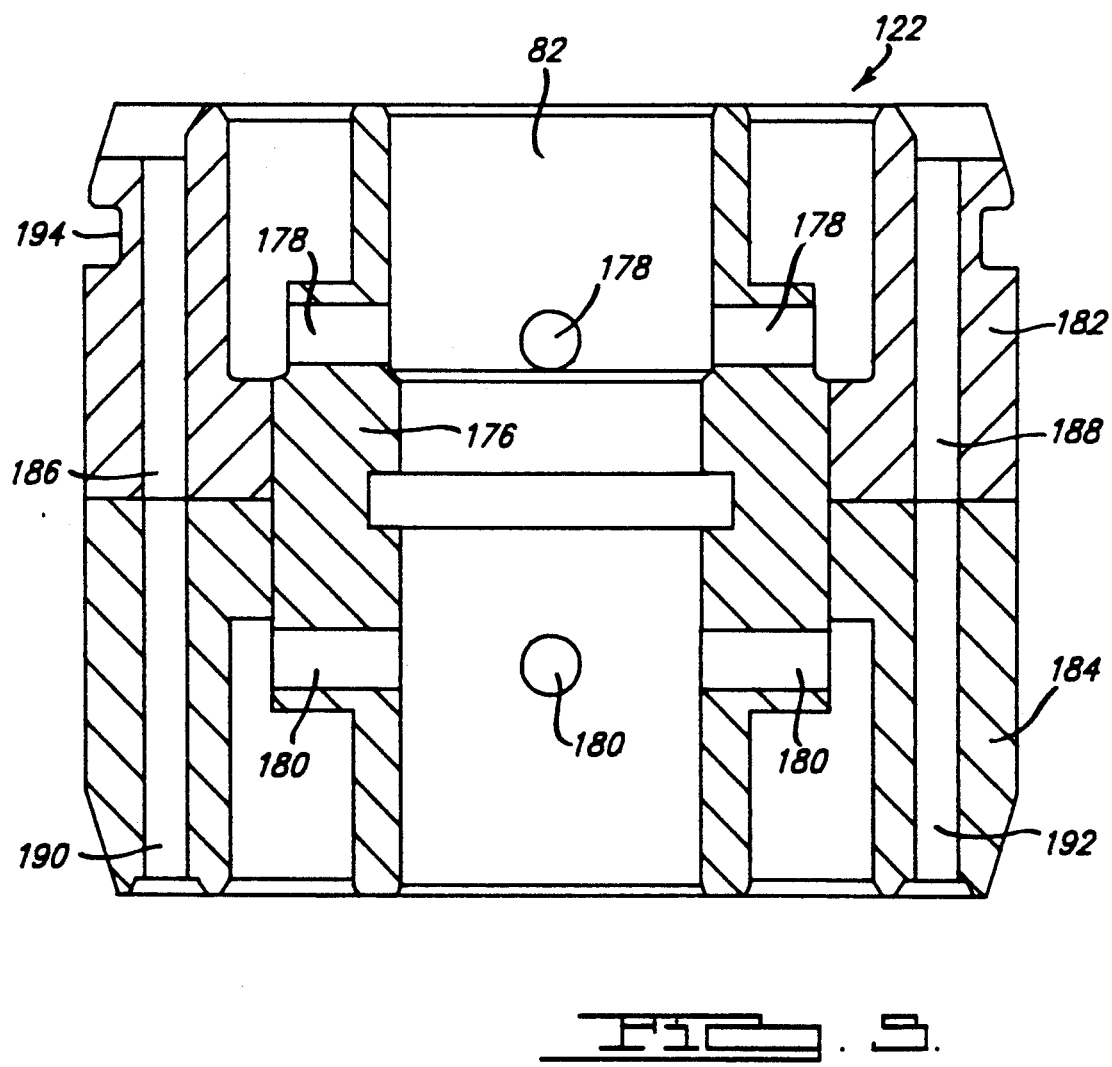
FIG. 5 is a cross-sectional view of the inner piston subassembly as well as the first and second outer piston subassemblies shown in FIG. 2.

The valve body 122 comprises an annular inner piston subassembly 176 as shown in FIG. 5. The annular inner piston subassembly 176 is disposed coaxially with the axial center line of the piston post 78, and is disposed on the outer radial periphery of the piston post 78 between the upper spring disk 136 and the lower spring disk 138. The inner piston subassembly 176 comprises a first plurality of flow passages 178 as well as a second plurality of flow passages 180. The first and second plurality of flow passages 178 and 180 radially extend from the axial center line of the inner piston subassembly 176. In addition, the center lines of the first plurality of flow passages 178 lie in a plane which is perpendicular to the axial center line of the inner piston subassembly 176. The center lines of the second plurality of flow passages 180 also reside in a plane which is perpendicular to the axial center line of the inner piston subassembly 176, though the flow passages 180 are displaced axially downward from the flow passages 178. The flow passages 178 fluidly communicate with a plurality of radially extending flow passages 179 which are disposed in the piston post 78, while the flow passages 180 communicate with a plurality of flow passages 181 also disposed in the piston post 78. The axial center lines of the flow passages 178 are colinear with the axial center lines of the flow passages 179, while the axial center lines of the flow passages 180 are colinear with the axial center lines of the flow passages 181.

The valve body 122 also comprises a first outer annular piston subassembly 182 and a second outer annular piston subassembly 184. The first and second outer annular piston subassemblies 182 and 184 are disposed on the radial outer peripheral edge of the inner piston subassembly 176 at a position proximate to the plane perpendicular to the axial center line of the piston assembly 46 dividing the inner piston subassembly 176 into similar portions. The first outer annular piston subassembly 182 comprises a plurality of flow passages 186 and 188 which extend coaxially with the axial center line of the piston post 78. In addition, the second outer annular piston subassembly 184 comprises a plurality of flow passages 190 and 192 which also extend coaxially with the axial center line of the piston post 78. Because the flow passages 186 of the first outer annular piston subassembly 182 are coaxial with the flow passages 190 of the second outer annular piston subassembly 184, the flow passages 186 and 190 form the vertical flow passages 124 as shown in FIG. 4A. Similarly, the flow passages 188 of the first outer annular piston subassembly 182 are coaxial with the flow passages 192 of the second outer annular piston subassembly 184 so as to form the flow passages 126 also shown in FIG. 4A.

The first outer annular piston subassembly 182 further comprises an annular groove 194 disposed on the radially outer surface of the subassembly 182. The annular groove 194 is of sufficient depth to secure the seal 196 (see FIG. 2B) disposed between the pressure cylinder 48 and the first outer annular piston subassembly 182. The annular inner piston subassembly 176, the first outer annular piston subassembly 182, as well as the second outer annular piston subassembly 184 may be rigidly secured to each after formation of the flow passages 178 and 180 by copper infiltration. Accordingly, difficulties otherwise encountered in forming the flow passages 178 and 180 if the subassemblies 176, 182 and 184 were initially an integral unit are reduced.

Figure 4B:
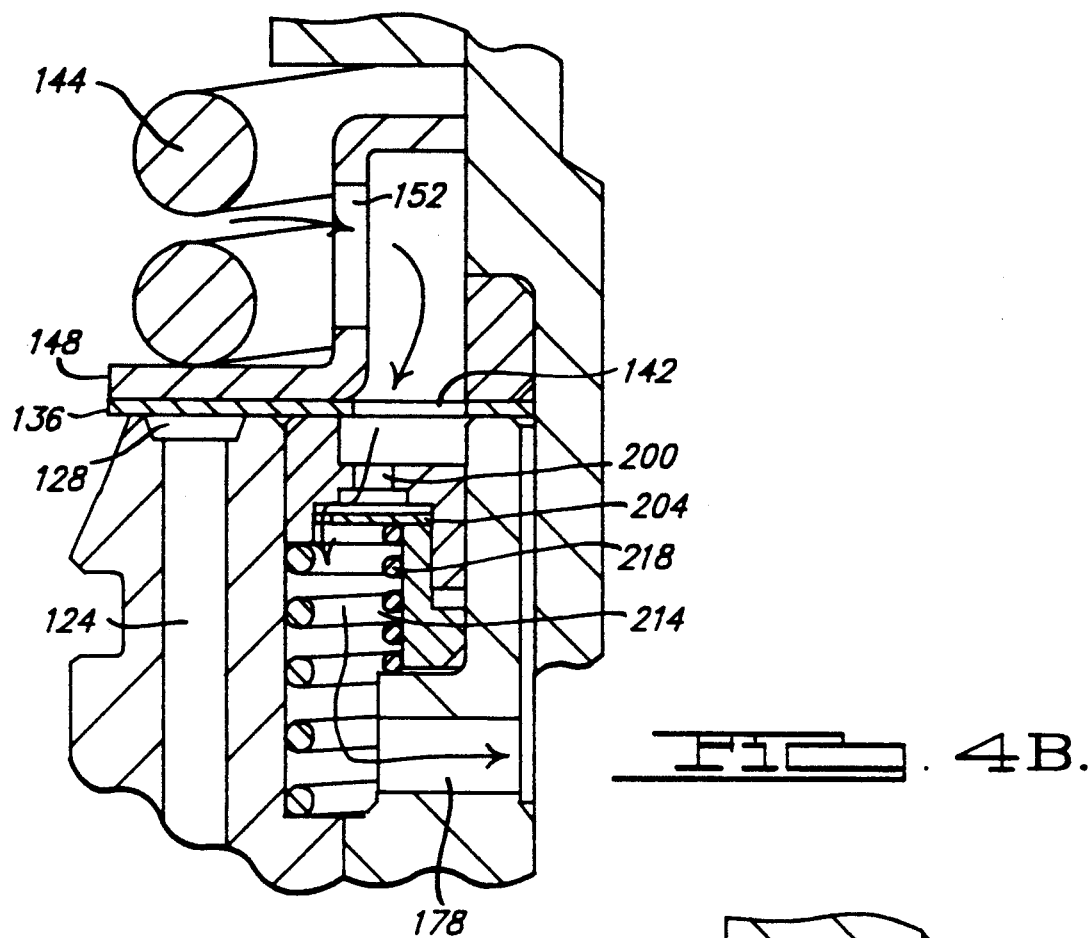
Figure 4C:
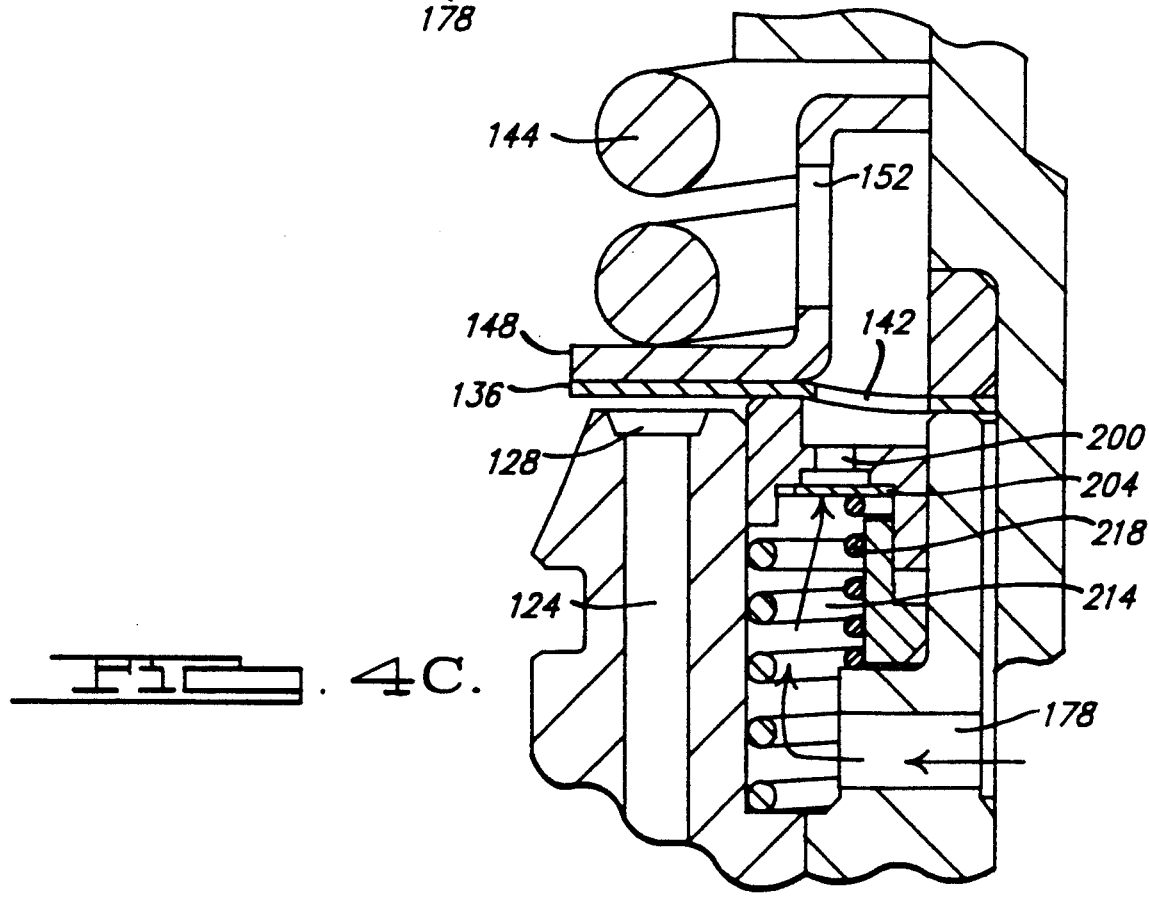

To vary the biasing force applied to the upper spring disk 136, an upper outer annular unloader 198 is provided (see FIGS. 4B and 4C). The radially inward surface of the upper outer unloader 198 is disposed on the radially outer surface of the upper portion of the inner piston subassembly 176. The radially outer surface of the upper outer unloader 198 mechanically communicates with the lower surface of the upper spring disk 136, and has a radially extended surface which mechanically communicates with the radially inner surface of the first outer annular piston subassembly 182. The central portion of the upper outer unloader 198 includes a flow passage 200 as well as a valve seat 202. The valve seat 202 is used to prevent upward movement of a valve disk 204 which is used to limit the flow of damping fluid through the flow passage 200 in a manner described below.

To positionally secure the inner periphery of the valve disk 204, an upper inner unloader 206 is provided. The upper inner unloader 206 is disposed on the outer radial periphery of the upper portion of the inner piston subassembly 176. The upper inner unloader 206 comprises an axially extending portion 208 having a radially inward surface which is disposed adjacent to a radially outward surface of a downwardly extending projection 212 of the upper outer unloader 198. Furthermore, the upper inner unloader 206 is disposed so that the upwardmost surface of the upper inner unloader 206 is proximate to a radially inwardmost portion of the valve disk 204 thereby securing the valve disk 204 between the upper outer unloader 198 and the upper inner unloader 206.

To bias the upper outer unloader 198 against the upper spring disk 136, a helical coil spring 214 is provided. The helical coil spring 214 is disposed coaxially between the lower surface of the radially outwardmost portion of the upper outer unloader 198 and a step portion 216 in the first outer piston subassembly 182. Because the spring 214 is in compression, the spring 214 biases the upper outer unloader 198 against the lower surface of the upper spring disk 136. In addition, to bias the valve disk 204 against the valve seat 202, a helical spring 218 is provided. The spring 218 is disposed coaxially with the axial center line of the piston post 78 adjacent to the upper inner unloader 206. Upward movement of the spring 218 is limited by the valve seat 202, while downward movement of the spring 218 is limited by a step 220 which is disposed on the outer surface of the inner piston subassembly 176. The spring 218 is used to bias the valve disk 204 against the valve seat 202.

To vary the biasing force applied to the lower spring disk 138, a lower outer annular unloader 222 is provided. The radially inward surface of the lower outer unloader 222 is disposed on the radially outer surface of the lower portion of the inner piston subassembly 176. The radially outer portion of the lower outer unloader 222 has an upper surface which mechanically communicates with the upper surface of the lower spring disk 138, and has a radially extended surface which mechanically communicates with the second outer annular piston subassembly 184. The central portion of the lower outer unloader 222 includes a flow passage 224 as well as a valve seat 226. The valve seat 226 is used to prevent downward movement of a valve disk 228 which is used to limit the flow of damping fluid through the flow passage 224 in a manner described below.

To positionally secure the inner periphery of the valve disk 228, a lower inner unloader 230 is provided. The lower inner unloader 230 is disposed on the outer radial periphery of the lower portion of the inner piston subassembly 176. The lower inner unloader 230 comprises an axially extending portion 232 having a radially inward surface which is disposed adjacent to a radially outward surface of a upwardly extending projection 236 of the lower outer unloader 222. Furthermore, the lower inner unloader 230 is disposed so that the lowermost surface of the lower inner unloader 230 is proximate to a radially inwardmost portion of the valve disk 228 thereby securing the valve disk 228 between the lower outer unloader 222 and the lower inner unloader 230.

To bias the lower outer unloader 222 against the lower spring disk 138, a helical coil spring 238 is provided. The helical coil spring 238 is disposed coaxially between the upper surface of the radially outwardmost portion of the lower outer unloader 222 and a step portion 240 in the second outer piston subassembly 184. Because the spring 238 is in compression, the spring 238 biases the lower outer unloader 222 against the lower spring disk 138. In addition, to bias the valve disk 228 against the valve seat 226, a helical spring 242 is provided. The spring 242 is disposed coaxially with the axial center line of the piston post 78 adjacent to the lower inner unloader 230 Upward movement of the spring 242 is limited by the valve seat 226, while downward movement of the spring 242 is limited by a step 244 which is disposed on the outer surface of the inner piston subassembly 176. The spring 242 is used to bias the valve disk 228 against the valve seat 226.

To control the flow of damping fluid between the first plurality of flow passages 178 and the second plurality of flow passages 180 in the inner piston subassembly 176, an annular upper plunger member 246 and an annular lower plunger member 248 are provided. The upper plunger member 246 is annular in shape and is disposed coaxially within the piston post 78. Disposed between the upper and lower surfaces of the upward plunger member 246 is a radially inwardly disposed step portion 250 which is used to seat a spring described below which bias the upper plunger member 246 in a downward direction. In addition, the upper plunger member 246 further comprises a pressure passage 252 which is axially disposed on the center line of the upper plunger member 246 and allows damping fluid to fluidly communicate therethrough. The lower portion of the upper plunger member 246 is secured to the upper portion of the lower plunger member 248 by a suitable means such as by welding.

The lower plunger member 248 is disposed coaxially within the piston post 78 and is cylindrical in cross-section. The lower plunger member 248 includes a region 254 located at the lower end of the lower plunger member 248 which has a reduced external radius. The region is used to allow damping fluid to flow between the flow passages 178 and 180 in the manner described below. In addition, the lower plunger member 248 includes a pressure passage 256 which allows damping fluid in the lower portion of the working chamber 50 to fluidly communicate with the pressure passage 252 of the upper plunger member 246 through the pressure passage 258 located at the lower end of the piston post 78.

To house the lower plunger member 248, a plunger housing 260 is provided. The plunger housing 260 is disposed on the inner periphery of the piston post 78 and extends coaxially therewith. The plunger housing 260 comprises a plurality of upper flow passages 262 and a plurality of lower flow passages 264. The upper flow passages 262 fluidly communicate with the flow passages 178 in the inner piston subassembly 176, as well as the flow passages 179 in the piston post 78. In addition, the lower flow passages 264 in the plunger housing 260 fluidly communicate with the second plurality of flow passages 180 in the inner piston subassembly 176, as well as the flow passages 181 in the piston post 78. Furthermore, the upper flow passages 262 are able to fluidly communicate with the lower flow passages 264 when the lower plunger member 248 is displaced sufficiently in an upward direction so that the region 254 of the lower plunger member 248 having a reduced external diameter is proximate to both the upper flow passages 262 and the lower flow passages 264.

The plunger housing 260 further comprises an upper annular groove 266 and a lower annular groove 268. Both the grooves 266 and 268 are disposed around the radial outer periphery of the plunger housing 260 adjacent to the piston post 78. The groove 266 is disposed between the upper flow passages 262 and the lower flow passages 264 in the plunger housing 260, while groove 268 is disposed between the lower flow passage 264 and the lowermost portion of the plunger housing 260. Disposed within the groove 266 is an annular seal 270 which prevents damping fluid from flowing between the plunger housing 260 and the piston post 78. Further, an annular seal 272 is disposed in the groove 268 which also prevents damping fluid from flowing between the plunger housing 260 and the piston post 78.

To limit downward movement of the plunger housing 260, the plunger housing 260 has a radial extending flange 274 disposed at the upper portion thereof. The flange 274 rests on a radially extending step portion 276 of the piston post 78. Because the internal diameter of the piston post 78 in the region proximate to the step portion 276 is less than the diameter of the radially outwardmost surface of the flange 274, the step portion 276 prevents the flange 274 and hence the plunger housing 260 from being displaced in a downward direction. Upward movement of the plunger housing 260 is limited by an annular spacer 278 which is disposed adjacent to the upper surface of the flange 274 of the plunger housing 260. The spacer 278 is disposed adjacent to the radially outward surface of the upper plunger member 246 and is also adjacent to the radially inwardmost surface of the piston post 78.

To cause movement of the lower plunger member 248 within the plunger housing 260, an annular coil 286 is provided. The annular coil 286 is disposed on the inner periphery of the piston post 78 at a position above the spacer 278. The coil 286 is formed around an annular coil sleeve 288 which resides on the inner periphery of the coil 286 and is located approximate to the radially outer surface of the upper plunger member 246. In addition, the annular coil 286 comprises a pressure passage 289 disposed axially through the sleeve 288 which permits damping fluid to fluidly communicate between the lower portion of the working chamber 50 and the pressure sensor described below.

As those skilled in the art will recognize, the upper plunger member 246, the lower plunger 248 and the coil 286 form a solenoid. The application of current to the coil 286 will cause the upper plunger member 246 to be upwardly displaced thereby causing the region 254 of the lower plunger member 248 to be proximate to the upper flow passages 262, as well as the lower flow passages 264. When this occurs, damping fluid is able to flow from the upper portion of the working chamber 50 to the area immediately above the lower outer unloader 222 during rebound through the following path passages: the flow passage 152, the flow passage 142, the flow passage 200, the flow passage 178, the flow passage 179, the flow passage 262, the flow passage formed between the region 254 and the plunger housing 260, the flow passage 264, the flow passage 181, and the flow passage 180. When this occurs, the increased pressure caused by fluid flowing through these flow passages causes the biasing forces exerted on the lower outer unloader 222 to increase, thereby causing the lower outer unloader 222 and hence the lower spring disk 138 to be displaced in a downward direction. More damping fluid is therefore able to flow through the flow passages 126 thereby decreasing the damping forces which the piston assembly 46 generates so as to provide a soft rebound stroke.

When the piston assembly 46 is in compression, damping fluid is able to flow through the following flow passages from the lower portion of the working chamber 50 to the region immediately below the upper outer unloader 198: the flow passage 172, the flow passage 160, the flow passage 224, the flow passage 180, the flow passage 181, the flow passage formed between the region 254 and the plunger housing 260, the flow passage 262, the flow passage 179, and the flow passage 178. When this occurs, the increased pressure caused by the fluid flowing through these flow passages cause the biasing forces exerted on the upper outer unloader 198 to increase (see FIG. 4C), thereby increasing the biasing force exerted on the upper spring disk 136 in an upward direction. Accordingly, a greater amount of damping fluid is able to flow through the flow passages 124 to thereby cause a soft compression stroke.

When the lower plunger member 248 is displaced downward in such a manner that the region 254 is not proximate to the flow passages 262 and 264, damping fluid is unable to flow between the upper portion of the working chamber 50 to the area above the lower outer unloader 222 during rebound, nor is able to flow from the lower portion of the working chamber 50 to the area immediately below the upper outer unloader 198 during compression. Accordingly, the only biasing forces exerted on the upper spring disk 136 is that which is exerted primarily by the spring 144 as the forces exerted by the springs 214 and 218 are negligible. Similarly, the only biasing force acting on the lower spring disk 138 is that which is generated primarily by the spring 162 as the forces exerted by the springs 238 and 242 are negligible. Accordingly, a firm rebound and compression stroke will be generated.

Figure 6A:
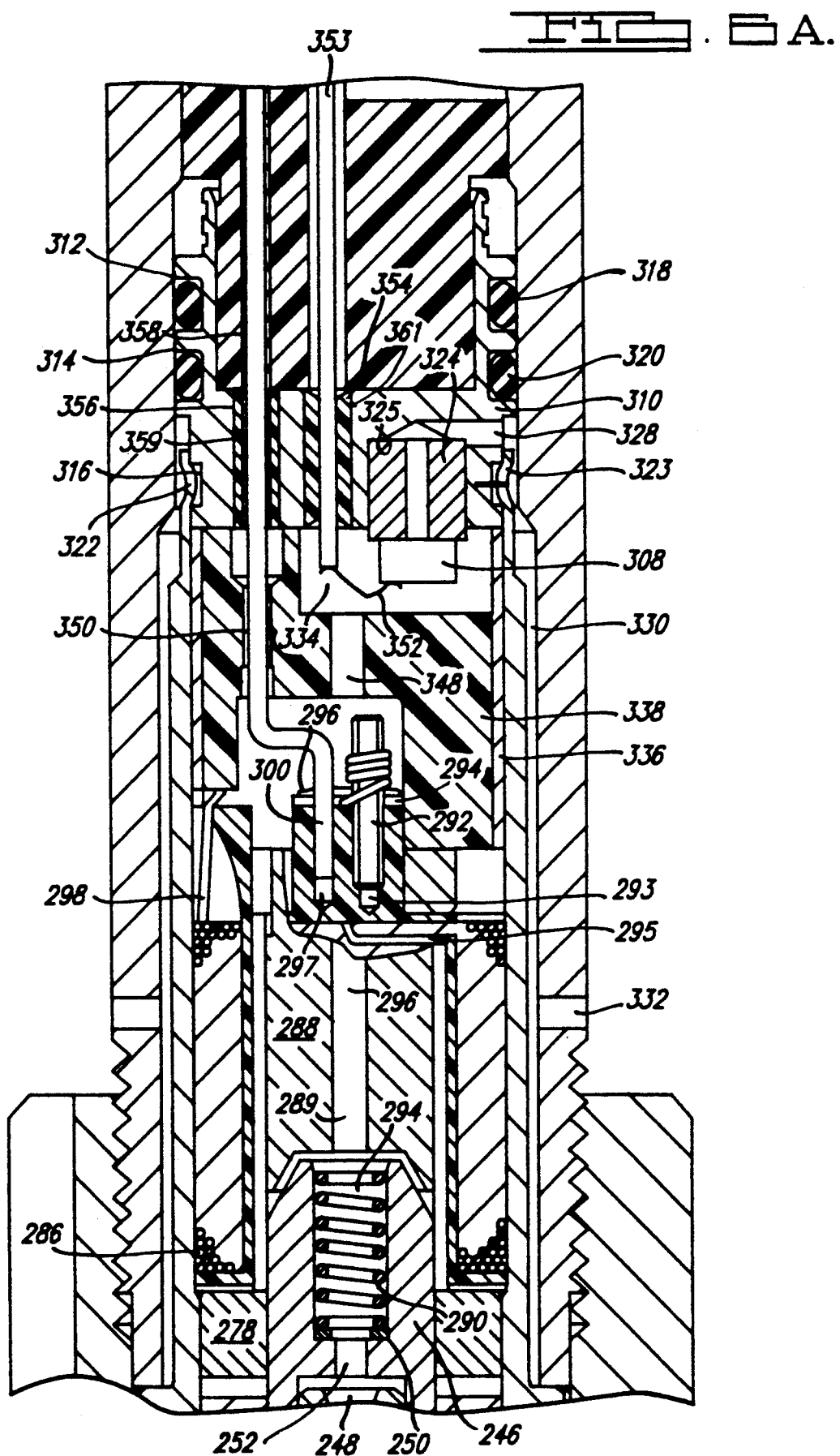
FIGS. 6A and 6B is a cross-sectional view of a portion of the piston rod shown in FIG. 2 taken in the region immediately above the piston nut.
Figure 6B:
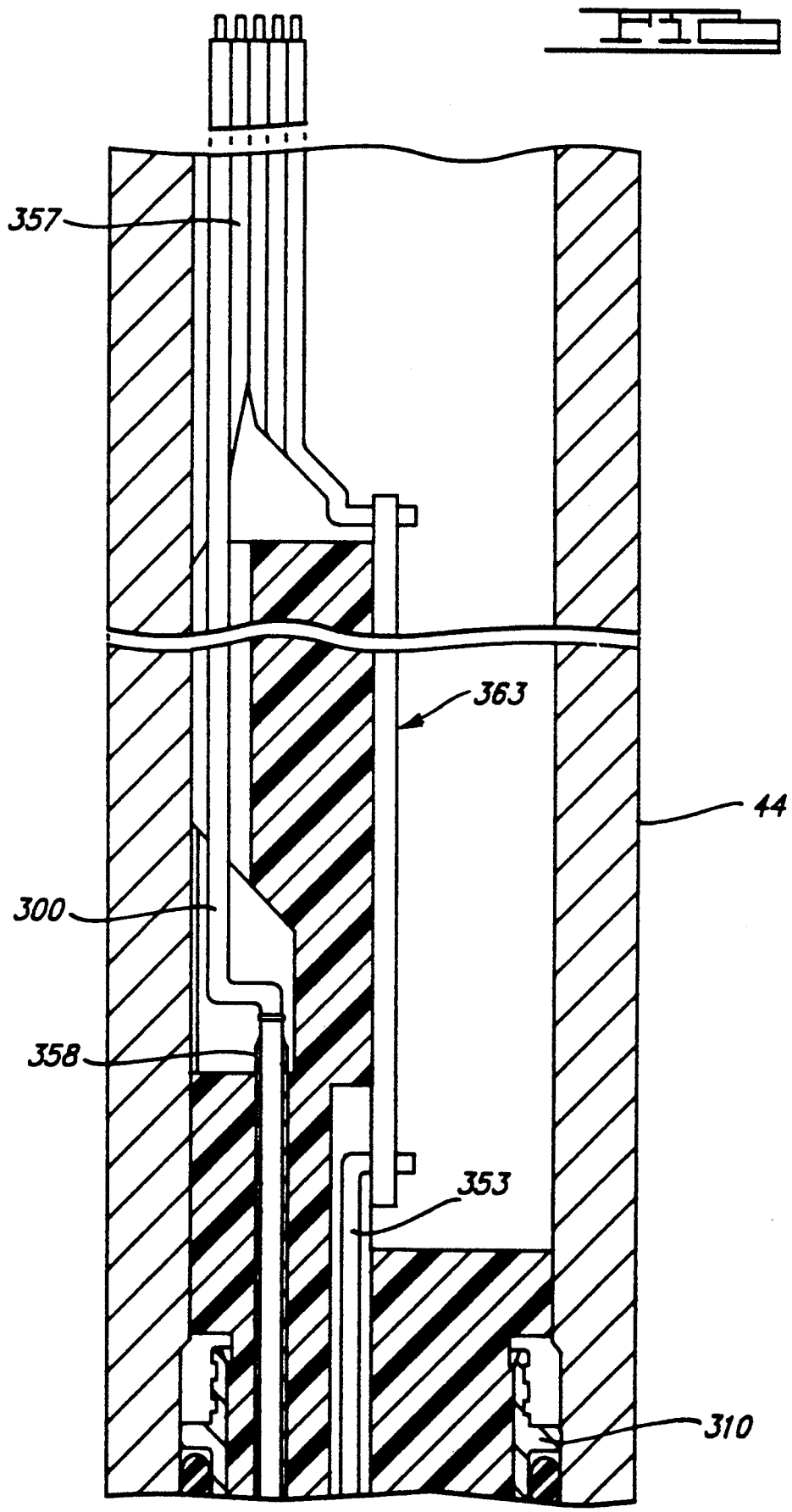

To bias the upper plunger member 246 and the lower plunger member 248 in a downward direction, a helical spring 290 is provided which is disposed coaxially within the upper plunger member 246. The lower portion of the helical spring 290 rests on the step portion 250 of the upper plunger member 246. The upper portion of the spring 290 rests on the lower surface of the annular coil sleeve 288. To allow the coil 286 to receive current from the electronic control module 34, the shock absorber 10 further comprises a pin 292. The pin 292 is disposed in a bore 293 which extends downwardly from the upper surface 294 of the annular coil sleeve 288. Wound around the upper portion of the pin 292 is a first lead 295 from the coil 286. A solder region 296 allows electrical communication between the lead 295 and one of two conductors 300 which is disposed within the bore 297 and used to allow electrical communication between the lead 295 and a flex circuit described below. While only one pin 292 is shown in FIG. 6A, it will be understood that another pin similar to pin 292 exists on the annular coil sleeve 288 which is able to accommodate the second lead 297 from the coil 286.

The second lead 297 is therefore able to electrically communicate with another of the conductors 300.

To determine whether the shock absorber 10 is in compression or rebound, a pressure sensor 308 is provided. The pressure sensor 308 is electrically connected to the signal conditioning circuits described below through four conductors 353 which are electrically connected to the pressure sensor 308 via the leads 352. The pressure sensor 308 is supported in the piston rod 44 by a header 310 which is disposed in the piston rod 44 at a position above the annular coil 286. The header 310 is annularly shaped and has three radially extending grooves 312, 314 and 316 on the outer periphery thereof. The groove 312 is used to accommodate an annular seal 318 which is disposed in the groove 312 between the piston rod 44 and the header 310. In addition, the groove 314 is used to accommodate an annular seal 320 which is also disposed between the piston rod 44 and the header 310, though at a position below the seal 318. The groove 316 is used to accommodate a radially inwardly directed tab 322 which is disposed at the upper end of the piston post 44. Because the groove 316 engages the tab 322, the tab 322 prevents movement of the header 310 within the piston rod 44. An anti-rotation pin 323 extends radially inward through the tab 322 and engages the header 310 so as to prevent rotational movement of the header 310 with respect to the piston post 78.

The pressure sensor 308 is secured to the lower surface of the header 310 by means of an annular tube 324 which is preferably fabricated from Kovar. The annular tube 324 is disposed in an upwardly extending bore 325 extending upwardly from the lower surface of the header 310. The annular tube 324 may be preferably secured to the bore 325 by epoxy cement, and the pressure sensor 308 may also be preferably secured to the lower surface of the annular tube 324 by epoxy cement. To allow the upper surface of the pressure sensor 308 to receive damping fluid from the upper portion of the working chamber 50, the header 310 includes a radially extending pressure passage 328. The pressure passage 328 allows damping fluid to fluidly communicate between the upper surface of the pressure sensor 308 and pressure passage 330 which is the region between the piston rod 44 and the piston post 78. The pressure passage 330 in turn fluidly communicates in turn with the pressure passage 332 which extends radially through the piston rod 44 into the upper portion of the working chamber 50. Accordingly, damping fluid from the upper portion of the working chamber 50 is able to fluidly communicate with the upper surface of the pressure sensor 308 through the pressure passage 328, the pressure passage 330 and the pressure passage 332.

To allow the lower surface of the pressure sensor 308 to be exposed to damping fluid at the same pressure as that which is in the lower portion of the working chamber 50, a pressure cavity 334 is provided. The pressure cavity 334 is disposed immediately adjacent to the lower surface of the pressure sensor 308. The upper surface of the pressure cavity 334 is formed by the header 310, while the sides of the pressure cavity 334 are formed in part by an annulus 336 which is disposed adjacent to the inside periphery of the piston post 78 at a position immediately below the header 310. The lower surface of the pressure cavity 334 as well as a portion of the side of the pressure cavity 334 is formed by a spacer 338 which will be more thoroughly described below.

The spacer 338 is disposed in the piston rod 44 between the pressure sensor 308 and the coil 286. To allow damping fluid in the pressure passage 289 of the annular coil 286 to fluidly communicate with the pressure cavity 334, the spacer 338 further comprises a central bore 348. The central bore 348 extends axially through the spacer 338 from the pressure cavity 334 to the region immediately adjacent the coil 286. In addition, the spacer 338 includes a bore 350 which extends also axially through the spacer 338. The bore 350 permits one of the conductors 300 from the coil 286 to pass through the spacer 338. A second bore (not shown) similar to the bore 350 is also located in the spacer and allows another of the conductors 300 to pass therethrough.

To allow the conductors 300 of the coil 286 and the conductors 353 from the pressure sensor 308 to pass through the header 310, the header 310 has four bores 354 and two bores 356 which extend axially through the header 310. Each of the bores 356 is sufficient to accommodate one of the two conductors 300 as it passes through the header 310.

In addition, the bores 356 are sufficiently large to accommodate a plurality of axially extending tubes 358 each of which extend through one of the bores 356. The tubes 358 are used to facilitate electrical connection between the coil 286 and the signal conditioning circuit assembly described below. A glass frit 359 is disposed in the region between each of the tubes 358 and the walls of the bores 356 through which the tubes 358 extend. The glass frit 359 disposed within the bores 356 is used to seal the bores 356 as well as to electrically isolate the tubes 358. Further, each of the conductors 300 are secured and sealed to the upper portion of the tube 358 through which the conductors 300 extend by solder at the upper portion of the tubes 358. Each of the conductors 353 are secured and sealed to the bores 354 through which they extend by means of glass frit 361 disposed between the walls of each of the bores 354 and the conductors 353.

The conductors 300, which electrically communicate with the annular coil 286, as well as the conductors 353, which electrically communicate with the pressure sensor 308, are electrically connected to a flex circuit 357 which is connected to a signal conditioning circuit assembly 363. The signal conditioning circuit assembly 363 is used to condition the signals received from the pressure sensor 308 which in turn are delivered to the electronic control module 34 through the flex circuit 357. In addition, the signal conditioning circuit assembly 363 also permits direct electrical communication between the flex circuit 357 and the conductors 300 (i.e., without signal conditioning) which in turn electrically communicates with the coil 286. The signal conditioning circuit assembly 363 may include electronic components which are able to temperature compensate, buffer and amplify the output from the pressure sensor 308. While the signal conditioning circuit assembly 363 may be that which is disclosed in U.S. Ser. No. 322,543, filed Mar. 13, 1989, other suitable signal conditioning circuit assemblies may be used.

As discussed above, the electronic control module 34 is used for controlling the damping characteristics of the shock absorbers 10 in response to the movement of the body and wheel of the automobile 12. For determining the relative velocity of the body 30, a plurality of accelerometers 364 are provided as shown in FIG. 7. The accelerometers 364 may be attached to the body near each wheel, or may be physically located within the piston rod 44 of each of the shock absorbers 10. As more fully discussed below, the output from each of the accelerometers 364 are integrated so as to determine the velocity at which the corner of the body 30 associated with the shock absorber 10 is moving. To decide whether the shock absorber 10 is in compression or rebound, the electronic control module 34 determines whether the output from the pressure sensors 308 associated with a shock absorber 10 is either positive or negative. For example, a positive output from the pressure sensor 308 indicates that the shock absorber 10 is in compression while a negative output from the pressure sensor 308 indicates that the shock absorber 10 is in rebound. By appropriately processing the information from the pressure sensor 308 and the accelerometer 364, the electronic control module 34 can adjust the damping characteristics of the shock absorber 10 to provide the desired ride and road holding characteristics.

The operation of the electronic control module 34 will now be described in greater detail. As shown in FIG. 7, the electronic control module 34 comprises a plurality of low-pass filters 366. Each of the low-pass filters 366 receives the output from one pressure sensor 308 or the output from one of the accelerometers 364. The low-pass filters 366 are used for eliminating high frequency signals and to provide anti-aliasing which might otherwise interfere with the operation of the electronic control module 34. The outputs from the low-pass filters 366 are delivered to a microprocessor 374. While the microprocessor may comprise an Intel 8097, other suitable microprocessors might be used.

The microprocessor 374 also receives input from the mode select switch 32. As discussed above, the mode select switch 32 is used by the driver for selecting the type of driving characteristics which are desired. For example, the driver of the automobile may either want firm damping characteristics, soft damping characteristics, or may want the electronic control module 34 to select the damping characteristics. In addition, the microprocessor 374 also receives input from a system undervoltage detection circuit 376. The system undervoltage detection circuit 376 is used to indicate to the microprocessor 374 that a low voltage condition (i.e., below 8.5-9.0 volts) is being experienced by the vehicle's electrical system which is generally indicated by the box designated by the numeral 378. When this occurs, the microprocessor 374 deactivates automatic damping system so as to provide firm damping during both compression and rebound.

The microprocessor 374 also receives the output from a power supply 380 which is connected to the vehicle igniting system 382. The power supply 380 and vehicle ignition system 382 of the automobile 12 generates three signals which are used by the electronic control module 34. The power supply 380 first generates a five-volt signal which is used for providing the supply voltage for the electronic control module 34. In addition, the power supply 380 generates a reset signal which is used by the microprocessor 374 to indicate that the ignition switch on the automobile has just been activated. Finally, the microprocessor 374 generates a pulse train (250-350 Hz) which is used for providing watchdog timing pulses to the power supply 380 so as to inhibit system reset.

The microprocessor 374 is used for executing the instructions which are provided in an EPROM 384 as will be more fully discussed below. The microprocessor 374 and the EPROM 384 are electrically connected to a RAM 386 which is used during the execution of the program stored in the EPROM 384. The microprocessor 374 also communicates with an EEPROM 388 which is used to receive and store the most recent diagnostic data concerning the failure modes of each of the shock absorbers 10, as well as data concerning the pressure sensor 308, the accelerometers 364, the coils 286, as well as the solenoid drivers 392. In addition, the microprocessor 374 electrically communicates with an external watchdog circuit 390 which prevents the coil 286 of each of the shock absorbers 10 from activating during power-up. In addition, the external watchdog circuit 390 monitors the output from the microprocessor 374 to determine whether the output is within a given range (i.e., 250-550 Hz). If the output of the microprocessor 374 is not with the given range, the external watchdog circuit 390 prevents the coils 286 from energizing.

The output from the microprocessor 374 containing information on how the coil 286 of each of the shock absorbers 10 should be energized is delivered to the solenoid drivers 392. The solenoid drivers 392 are used for controlling the current which is delivered to the coil 286 associated with each shock absorber 10. The solenoid drivers 392 may be used for providing a relatively high current to the coil 286 so as to cause the position of the lower plunger member 248 to change, then reducing the current to a holding current so as to maintain the position of the lower plunger member 248 while preventing the coil 286 from burning out.

In addition, the electronic control module 34 comprises a failsafe detection circuit 393. The failsafe detection circuit 393 is used for shutting down the operation of the damping system in the event that a short or open circuit is detected in any of the coils 286.

For development purposes, it may also be useful to have the electronic control module 34 include a serial data link circuit 394, a LED panel 396, as well as a digital-to-analog converter 400. The data link circuit 394 is used to provide an RS232 interface between the microprocessor 374 and development tools such as an external computer. The LED panel 396 may be used to visually indicate whether each of the shock absorbers 10 are adjusted to provide firm or soft damping during compression and rebound. The digital-to-analog converter 400 may be used to provide an analog output for purposes of adjusting various system parameters described below and for monitoring internal signals.

Before discussing the operation cf software which is shown in FIGS. 8-14, it will be noted that two alternative methods have been developed for causing the shock absorbers 10 to provide firm damping during both compression and rebound if the amplitude of the vertical movement of the wheel becomes too great at the resonant frequency of the wheels. In the first method, a high-pass filter is used to initially filter the frequency of the vertical movement of the wheel so as to allow only frequencies at or above the resonance frequency (i.e., RESONANCE FREQUENCY) of the wheel to be considered. Then if the amplitude of the wheel movement exceeds a given threshold (i.e., WHEEL_CONTROL_THRESHOLD) when the frequency exceeds the resonance frequency, the microprocessor 374 causes firm damping to be provided during both compression and rebound. The high-pass filtering method may also involve rectifying the output from the high-pass filter and passing it through a low-pass filter so as to smooth the signal. In the second method, the discrete fourier transform of the differential pressure between the upper and lower portions of the working chamber is first calculated. The discrete fourier transform is then compared to a threshold, the exceedance of which will cause firm damping during both compression and rebound. The manner in which each of these methods are used will be described below.

The MAIN routine, which is shown in FIG. 8, acts as a scheduler for the program. The first step in the MAIN routine is step 404 which causes the INITIALIZATION routine to be performed. As more fully discussed below, the INITIALIZATION routine, represents a portion of the MAIN routine, which is used for clearing RAM data storage space as well as for initializing and reserving storage space for the stack pointer. After step 404 is executed, the step 408 is executed. At step 408, the microprocessor 374 initializes certain variables to indicate that the left front shock absorber 10 will be the first to be evaluated. In this regard, the variable CORNER which represents the data location of the information regarding one of the four shock absorbers 10 is set equal to a memory location which represents the base location of the data concerning the left front shock absorber. Further, the variable SOL_MASK is set to 00 00 00 11 bitwise which is used in the DECIDE routine described below to indicate which of the four shock absorbers 10 is currently under evaluation. Finally, the variable CONSTANT is set equal to a value which indicates that the data from either of the two front shock absorbers is being considered.

After executing step 408, the microprocessor 374 executes step 410. At step 410, the microprocessor 374 determines whether a timer interrupt has occurred which happens every two milliseconds. If the timer interrupt has not occurred at the time step 410 is executed, step 410 is again executed to determine whether a timer interrupt has occurred. This process continues until the microprocessor 374 determines at step 410 that a timer interrupt has occurred.

After the microprocessor 374 determines that a timer interrupt has occurred at step 410, the microprocessor 374 executes step 412. At step 412, the microprocessor 374 determines whether the driver of the automobile 12 has set the mode select switch 32 in automatic mode. If the microprocessor 374 determines at step 412 that the mode select switch 32 is not in automatic mode, the microprocessor 374 executes step 414. At step 414, the microprocessor 374 determines whether the driver of the automobile 12 has set the mode select switch 32 in manual mode. If the microprocessor 374 determines at step 414 that the mode select switch 32 is not in manual mode, the microprocessor 374 executes step 414 in which a diagnostic routine may be executed. If the microprocessor 374 determines at step 414 that the driver of the automobile 12 has set the mode select switch 32 in manual mode, the microprocessor 374 then executes step 418 in which the MANUAL portion of the MAIN routine is executed which is discussed below. After the MANUAL portion of the MAIN routine is executed at step 418, the microprocessor 374 then returns to step 420 discussed above.

If the microprocessor 374 determines at step 412 that the driver of the automobile 12 has set the mode select switch 32 in automatic mode, the microprocessor 374 executes step 420. As more fully described below, step 420 calls the CALC_VEL routine which is used to calculate the vertical velocity of the corner of the body from the outputs from one of the accelerometers 364 which corresponds to that corner. After the microprocessor 374 executes step 420, the microprocessor 374 executes step 422 in which the PRESSURE routine is called. As more fully described below, the PRESSURE routine is used to determine whether the shock absorber 10 in question is either in compression or rebound.

As discussed above, these are two alternative methods which may be used to cause the shock absorber 10 to provide firm damping during compression and rebound if excessive vertical wheel movement occurs. If the high-pass filtering method is used, the microprocessor 374 executes step 425 in which the microprocessor 374 determines whether the frequency of vertical movement of the wheel exceeds the resonant frequency of the wheel (10-15 Hz) by using a high-pass filtering routine.

After executing step 425 or if at step 422 the discrete fourier transform method is used to determine whether there is excessive vertical wheel movement, the microprocessor 374 executes step 424 in which the DECIDE routine is called. As described below, the DECIDE routine is used for determining whether the shock absorber 10 in question should be adjusted so as to provide a firm or soft damping characteristics. After executing step 424, the microprocessor 374 executes step 426 in which the SOLENOID routine is called. As discussed below, the SOLENOID routine is used for determining whether the coil 286 should be energized or deenergized. After the step 426 has been executed, the microprocessor 374 executes step 428. At step 428, the microprocessor 374 determines whether the value of the variable CORNER is equal to the RAM address location where information regarding the right rear shock absorber is stored.

If the value of CORNER is equal to a RAM address location where in formation concerning the right rear shock absorber is stored and the discrete fourier transform method is used for causing firm damping upon excessive vertical wheel movement, the microprocessor 374 executes step 430. At step 430, the microprocessor 374 calls the AMPLITUDE routine which takes the discrete fourier transform of the output from the pressure sensor 308. The discrete fourier transform of the output of the pressure sensor 308 is then set equal to the variable AMP which is used in the DECIDE routine described below. The discrete fourier transform is calculated by the AMPLITUDE routine according to the following equation:

$$\text{AMP} = \left[ \left( \sum_{t=0}^{T} P_t \times \sin \frac{2\pi t}{T} \right)^2 + \left( \sum_{t=0}^{T} P_t \times \cos \frac{2\pi t}{T} \right)^2 \right]$$

where:

$P_t$ is the differential pressure between the upper portion and the lower portion of the working chamber 50 at time t; and T is the period of the resonant frequency of the wheels of the automobile 12 (i.e., the reciprocal of RESONANCE FREQUENCY).

Each time step 430 is executed, the discrete fourier transform of pressure response for a different shock absorber is calculated. Further, step 430 is unnecessary if the high-pass filter method of determining whether there is excessive vertical wheel movement is used. After executing step 430, or if at step 428 the high-pass filter method is used for causing firm damping upon excessive vertical wheel movement and the variable CORNER is equal to the RAM address location where information regarding the right rear shock absorber is stored, the microprocessor 374 executes step 431. At step 431, the microprocessor 374 causes the LED panel 396 to illuminate to provide an indication of whether a firm or soft compression and rebound stroke is desired for each shock absorber. Step 431 is generally used for developmental purposes. After executing step 431, the microprocessor 374 executes step 408 discussed above.

If the value of the variable CORNER is not equal to the RAM address location where information regarding the right rear shock absorber is stored, as determined at step 428, the microprocessor 374 executes step 432. At step 432, the microprocessor 374 shifts the bit pattern in SOL_MASK to the left by two bits. For example, if the last shock absorber 10 to be evaluated was the left corner shock absorber, the SOL_MASK bit pattern would change from 00 00 00 11 to 00 00 11 00. Also at step 432, the value of the variable CORNER is increased by an offset so as to indicate the address of the data regarding the next shock absorber 10 which is to be adjusted.

After executing step 432, the microprocessor 374 executes step 434 which determines whether the value of the variable CORNER is greater than the base RAM address location where information regarding the rear shock absorbers 10 are stored. Accordingly, step 434 determines whether the data concerning the front shock absorbers is being reviewed, or is the data concerning the rear shock absorbers being reviewed. As discussed below, different parameters are used with the front shock absorbers 10 as compared to the rear shock absorbers 10.

If at step 432 the microprocessor 374 determines that the value of the variable CORNER is not greater than the base RAM address location where information regarding the rear shock absorbers 10 are stored, the microprocessor 374 executes step 420 discussed above. If at step 434 the microprocessor 374 determines that the value of the variable CORNER is greater than the base RAM address location where information regarding the rear shock absorbers are stored, the microprocessor 374 executes step 434 in which the variable CONSTANT is set equal to a value which indicates that a rear shock absorber is being evaluated. After executing step 436, the microprocessor 374 executes step 420 discussed above.

The INITIALIZATION routine, which represents a portion of the MAIN routine, will now be described with reference to FIG. 9. The first step in the INITIALIZATION routine is step 440 in which the outputs of the microprocessor 374 which are delivered to the solenoid drivers 392 are disabled. After executing step 440, the microprocessor 374 executes step 442 which causes a one second delay to occur. This delay allows the pressure sensors 308 as well as the accelerometers 364 to power-up and thereby generate a signal indicative of current status of the shock absorber 10. After executing step 442, the microprocessor 374 executes step 444. At step 444, the microprocessor 374 determines whether serial communication has been requested via the data link circuit 394. If communication has been requested as determined by step 442, the microprocessor 374 executes step 446 in which establishes a serial communications port. After executing step 446 or if at step 444 the microprocessor 374 determines that serial communication has not been requested, the microprocessor then executes step 448.

At step 448, the microprocessor 374 determines whether the parameters used for adjusting the shock absorbers 10 have been altered. The parameters which are used by the microprocessor 374 are given below:

FIRM-ON TIME: The number of cycles which the shock absorber is held in firm rebound or firm compression (typically 50 cycles depending on the vehicle type and the desired ride characteristics).

WHEEL_CONTROL_THRESHOLD: Is used as a threshold for determining whether the DECIDE routine should cause the shock absorber in question to provide firm damping during compression and rebound (typically 90 psi).

RESONANCE FREQUENCY: Is the resonant frequency of the wheels of automobile 12 (typically 10–12 Hz).

POS_THRESHOLD: Is the positive velocity threshold, the exceedance of which will cause the DECIDE routine to signal a firm rebound stroke (typically 5–8 inches/sec.).

NEG_THRESHOLD: Is the negative velocity threshold, the exceedance of which will cause the DECIDE routine to signal a firm compression stroke (typically 5–8 inches/sec.).

PRESS_DEADBAND: Is used to set a level between which a pressure signal is considered noise.

Because the damping characteristics of the front shock absorbers are generally different than the damping characteristics of the rear shock absorbers, the value of these parameters for a given shock absorber will depend in part on whether the shock absorber is located in the front or the rear of the automobile 12 (i.e., a different set of parameters is used for the front set of shock absorbers than is used for the rear set). These parameters are stored in the memory of the microprocessor 374 and will be used unless the microprocessor 374 determines at step 448 that the parameters have been altered. If at step 448 the microprocessor 374 determines that the parameters have not been altered, the microprocessor 374 executes step 450 which loads the default parameters into the memory of the microprocessor 374.

After executing step 450, or if at step 448 the microprocessor 374 determines that the parameters have been altered, the microprocessor 374 executes step 452 in which the storage locations in the RAM 386 other than those storing the parameters are cleared. After executing step 452, the microprocessor 374 executes step 454 in which the microprocessor 374 reads and computes the DC bias voltages from the pressure sensors 308 and the accelerometers 364.

After executing step 454, step 406 is executed which initializes the interrupts. These interrupts include the cycle time interrupt which is set at two milliseconds, as well as a discrete fourier transform interrupt (if a discrete fourier transform is used) which is used when the pressure values of the pressure sensors 308 to be read. An interrupt is also used for pulsing voltage to the coil 286 if the coil 286 is driven by pulse width modulation. An interrupt may also be associated with external data communications if desired during development. After executing step 406, the microprocessor 374 causes step 408 of the MAIN routine to be executed.

The CALC_VEL routine will now be described with reference to FIG. 10. The first step in the CALC_VEL routine is step 460 in which the microprocessor 374 converts the analog output of one of the accelerometers 364 into digital form and sets the digitized value of the acceleration equal to the variable ACC. After the acceleration is read at step 460, the microprocessor 374 performs high-pass filtering to determine the D.C. bias voltage by executing the steps 462–470. At step 462, the D.C. average acceleration AVE_A, which is determined from the DC bias voltage of the accelerometers 364, is read from memory. After executing step 462, the microprocessor 374 executes step 464 which adds the value of ACC to the DC average acceleration AVE_A and sets this value equal to AVE_A.

After executing step 464, the microprocessor 374 executes step 466 in which the value of AVE_A divided by the constant K is subtracted from the value of AVE_A. The value of the constant K in the CALC_VEL routine is equal to 500 to give a cutoff frequency of 0.16 Hz. The result of this subtraction is then assigned to the variable AVE_A'. After executing step 466, the microprocessor 374 executes step 468. At step 468, the value of AVE_A' divided by the value of the constant K is subtracted from the value of ACC. This value is then set equal to the variable ACC. After executing step 468, the microprocessor 374 executes step 470 which stores the value of AVE_A' memory which is used as the DC average acceleration for the next cycle for the shock absorber 10 under consideration. After executing step 470, the microprocessor 374 executes step 472 in which velocity is calculated by multiplying the value of ACC by the change in time from the last time that velocity was calculated for the shock absorber 10 under consideration (approximately 2 milliseconds) and is added to the value of the variable VEL which represents the vertical velocity of the corner of the body. The result of this addition is then assigned to the variable VEL. After executing step 472, the microprocessor 374 executes step 474 in which the value of the variable VEL is stored in memory. The microprocessor 374 then executes step 476 in which the microprocessor 374 is instructed to use the next A/D channel for the next input (i.e., from the pressure sensor 308). Control is then returned to the MAIN routine by the return step 478.

The PRESSURE routine will now be described with reference to FIG. 11. The first step of the PRESSURE routine is step 482 which causes the microprocessor 374 to convert the analog output of one of the pressure sensors 308 into digital form and sets this output equal to the variable PRES. After reading the pressure from the pressure sensor 308 at step 482, the microprocessor 374 performs high-pass filtering which determines the DC bias voltage of the output of the pressure sensor 308. After reading the DC average pressure AVE_P from memory at step 484, the microprocessor 374 executes step 486 in which the current pressure PRES is added to the DC average pressure AVE_P. The result of this addition is assigned to the variable PRES. After executing step 486, the microprocessor 374 executes step 488 in which the value of AVE_P is first divided by the constant K and then is subtracted from the value of AVE_P. The result of this subtraction is then assigned to the variable AVE_P'. The value of K in the PRESSURE routine is equal to 6,5535 which corresponds to a cutoff frequency of 0.001 Hz. After executing step 488, the microprocessor 374 executes step 490 which first divides the value of AVE_P' by K and then subtracts the resulting value from the value of the variable PRES to give absolute pressure. The resulting value is assigned to the variable PRES. After executing step 490, the microprocessor 374 executes step 492 which stores the value of AVE_P' in memory for the next cycle for the shock absorber 10 under consideration. Step 494 is then executed which stores the value of PRES in memory. After executing step 494, the microprocessor 374 executes step 496 in which the microprocessor 374 is instructed to use the next A/D channel for the next input (i.e., the output from the accelerometer 364 of the next shock absorber 10 to be examined). The control is then returned to the MAIN routine by return step 500.

Figure 12:
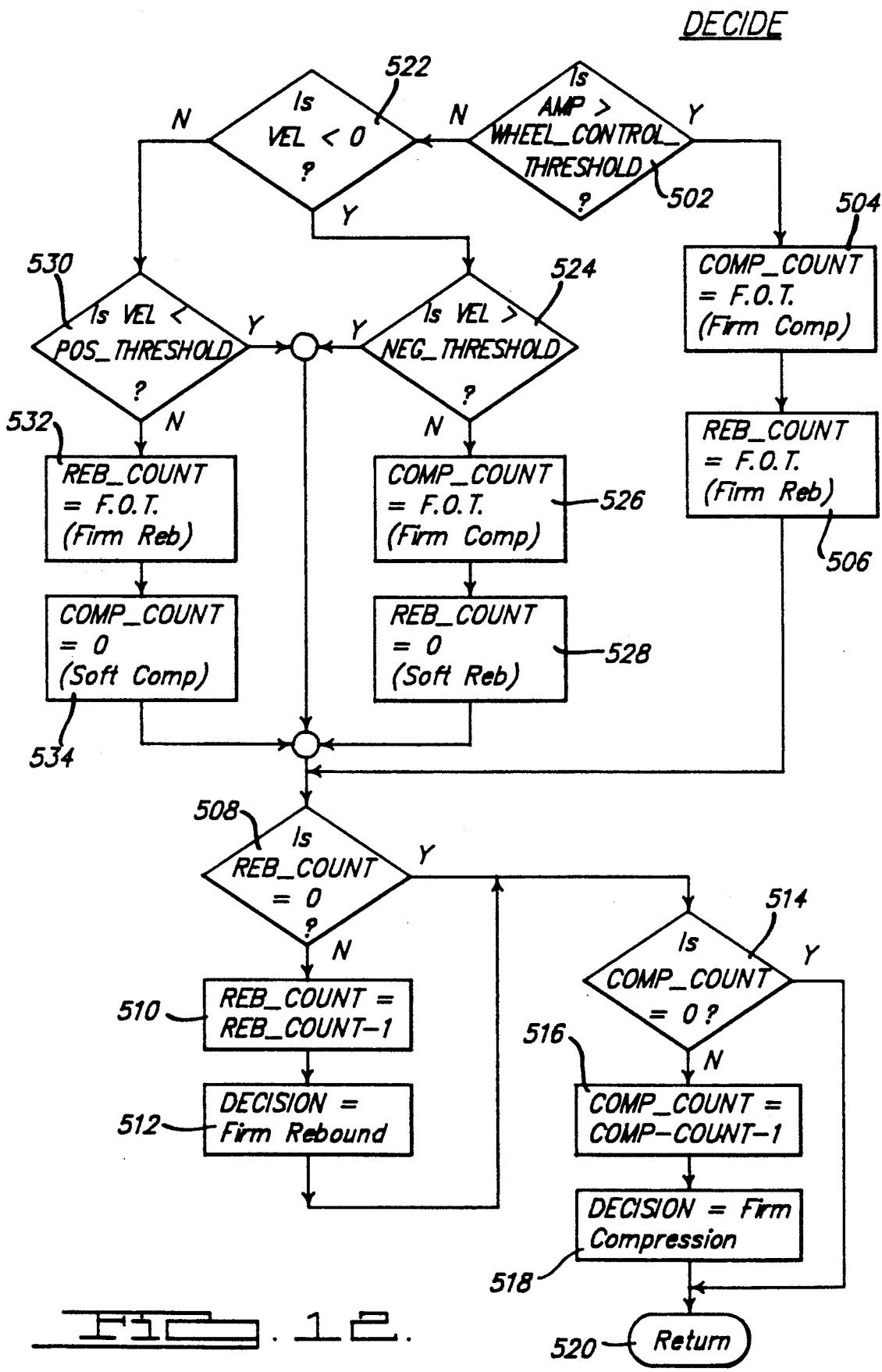
FIG. 12 is a flow chart of the DECIDE routine which is used by the microprocessor shown in FIG. 8 for controlling the shock absorber shown in FIG. 2.

The DECIDE routine will now be described with reference to FIG. 12. The first step in the DECIDE routine is step 502 in which the microprocessor 374 determines whether the variable AMP is greater than the parameter WHEEL_CONTROL_THRESHOLD. If the value of the variable AMP is greater than the value of WHEEL_CONTROL_THRESHOLD, there is excessive vertical movement of the wheels and therefore both firm compression and firm rebound are desired. Accordingly, the microprocessor 374 executes step 504 which equates the compression timer COMP_COUNT to the parameter FIRM-ON TIME which is equal to 50 cycles. After executing step 504, the microprocessor 374 executes step 506 in which the rebound timer REB_COUNT is equal to the value of the parameter FIRM-ON TIME which is again equal to 50 cycles. After executing step 506, the microprocessor 374 executes step 508 which determines whether the value of REB_COUNT is equal to zero. If REB_COUNT is not equal to zero, the microprocessor 374 executes step 510 which decrements the value of REB_COUNT by one. After executing step 510, the microprocessor 374 executes step 512 which equates the value of the variable DECISION with the bit pattern indicating that a firm rebound is desired. This is done by anding the bit pattern of SOL_MASK by the bit pattern 55H.

After executing step 512, or if at step 508 the microprocessor 374 determines that REB_COUNT is equal to zero, the microprocessor 374 executes step 514 which is used to determine whether the shock absorber 10 has been in firm compression for the requisite length of time. To perform this function, step 514 determines whether the value of COMP_COUNT is equal to zero. If the value of COMP_COUNT is not equal to zero, the microprocessor 374 executes step 516 which decrements the value of COMP_COUNT by one.

After executing step 516, the microprocessor 374 executes step 518 in which the bit pattern of the variable DECISION is set equal to a value that indicates that a firm compression stroke is desired. This is done by anding the bit pattern of SOL_MASK by the bit pattern AAH. After executing step 518, or if at step 514 the bit pattern of COMP_COUNT is equal to zero, control is returned to the MAIN routine by the return step 520.

If at step 502 the microprocessor 374 determines that the value of AMP is not greater than WHEEL_CONTROL_THRESHOLD, the microprocessor 374 executes step 522. At step 522, the microprocessor 374 determines whether the vertical velocity of the corner of the body 30 is negative by determining whether the value of the variable VEL is less than zero. If the value of the variable VEL is less than zero, the microprocessor 374 executes step 524 which determines whether the downward velocity of the body to which the shock absorber 10 is connected is greater than the negative threshold by determining whether the value of the variable VEL is greater than the parameter NEG_THRESHOLD. If the value of the variable VEL is greater than the parameter NEG_THRESHOLD (i.e., closer to zero), the microprocessor 374 then executes step 508 described above. If the value of the variable VEL is not greater (i.e., more negative) than the parameter NEG_THRESHOLD, the microprocessor 374 executes step 526 which is used to set the compression timer COMP_COUNT to the parameter FIRM-ON TIME. After executing step 526, the microprocessor 374 executes step 528 which is used to set the rebound timer REB_COUNT equal to zero so as to produce a soft rebound stroke. After executing step 528, the microprocessor 374 executes step 508 described above.

If at step 522 the microprocessor 374 determines that the value of the variable VEL is not less than zero, the microprocessor 374 executes step 530. At step 530, the microprocessor 374 determines whether the velocity of the corner of the body 30 is less than a positive threshold by determining whether the value of the variable VEL is less than the parameter POS_THRESHOLD. If the value of VEL is less than the parameter POS_THRESHOLD, the microprocessor 374 executes step 508 described above. If at step 530 the value of VEL is not less (i.e., more positive) than the parameter POS_THRESHOLD, the microprocessor 374 executes step 532. At step 532, the microprocessor 374 sets the rebound timer REB_COUNT equal to 50 cycles so as to obtain a firm rebound stroke. After executing step 532, the microprocessor 374 executes step 534 in which the value of the compression timer COMP_COUNT is set equal to zero so as to produce a soft compression stroke. After executing step 534, the microprocessor 374 then executes step 508 described above.

Figure 13:
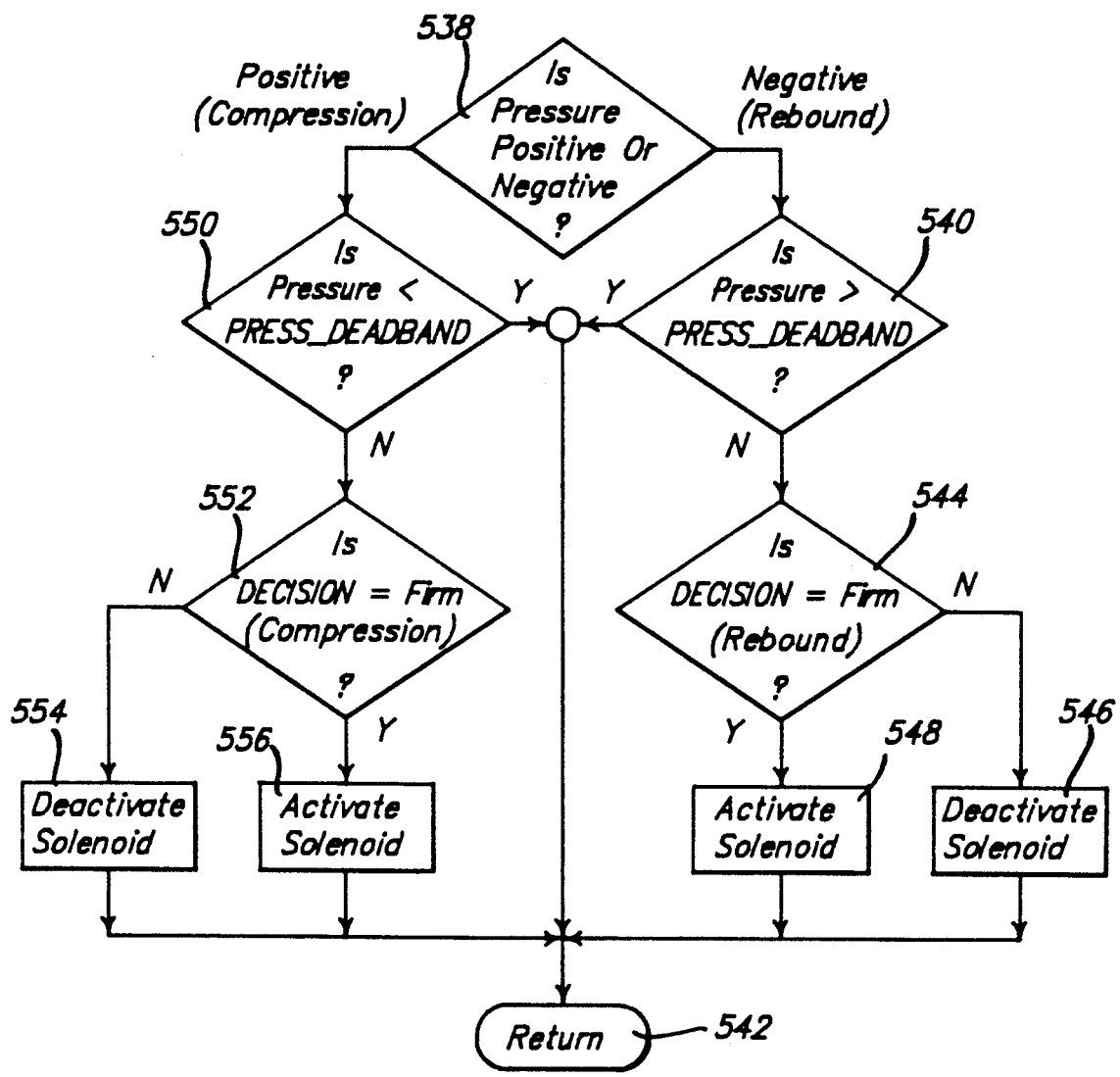
FIG. 13 is a flow chart of the SOLENOID routine which is used by the microprocessor shown in FIG. 8 for controlling the shock absorber shown in FIG. 2.

The SOLENOID routine will now be described with reference to FIG. 13. The first step in the SOLENOID routine is step 538 which is used to determine whether the shock absorber 10 for a given corner is in compression or rebound. This is done by determining whether the pressure sensed by the pressure sensor 308 is positive or negative. If the output from the pressure sensor 308 is negative thus indicating that the shock absorber 10 is in rebound, the microprocessor 374 executes step 540 which determines whether the pressure signal from the pressure sensor 308 is greater than the value of the parameter PRESS_DEADBAND. If at step 540 the microprocessor 374 determines that the output from the pressure sensor 308 is less than the parameter PRESS_DEADBAND, the output of the pressure sensor 308 is assumed to be noise and the microprocessor 374 returns control to the MAIN routine via the return step 542.

If at step 544 the microprocessor 374 determines that the output from the pressure sensor 308 is greater than PRESS_DEADBAND, the microprocessor 374 executes step 544 which determines whether the bit pattern of the variable DECISION is equal to a value indicating that a firm compression stroke is desired. If at step 548 the microprocessor 374 determines that the bit pattern of the variable DECISION is equal to a value indicating that a firm compression stroke is desired, the microprocessor 374 executes step 548 which energizes the coil 286. Control is then returned to the MAIN routine via the return step 542. If at step 544 the microprocessor 374 determines that the bit pattern of the variable DECISION is not equal to a value indicating that a firm compression stroke is desired, the microprocessor 374 executes step 546 which deenergizes the coil 286 if it is energized. The microprocessor 374 then returns control to the MAIN routine via the return step 542.

If at step 538 the microprocessor 374 determines that the signal from the pressure sensor 308 is positive thus indicating that the shock absorber 10 is in compression, the microprocessor 374 executes step 550 which determines whether the signal from the pressure sensor 308 is less than the value of the parameter PRESS_DEADBAND. If the pressure signal from the pressure sensor 308 is less than the parameter PRESS_DEADBAND, the output of the pressure sensor 308 is assumed to be noise. Accordingly, the microprocessor 374 returns control to the MAIN routine via the return step 542. If at step 550 the microprocessor 374 determines that the output from the pressure sensor 308 is greater than the parameter PRESS_DEADBAND, the microprocessor 374 executes step 552 which determines whether the bit pattern of the variable DECISION is equal to a value which indicates that a firm compression stroke is desired. If the bit pattern of DECISION is equal to a bit pattern which represents that a firm compression stroke is desired, the microprocessor 374 executes step 556 which energizes the coil 286. The microprocessor 374 then returns control to the MAIN routine via the return step 542. If at step 552 the microprocessor 374 determines the value of DECISION is not equal to a bit pattern which represents that a firm rebound stroke is desired, the microprocessor 374 executes step 554 which deenergizes the coil 286 if energized. After executing step 552, the microprocessor 374 returns control to the MAIN routine via the return step 542.

Figure 14:
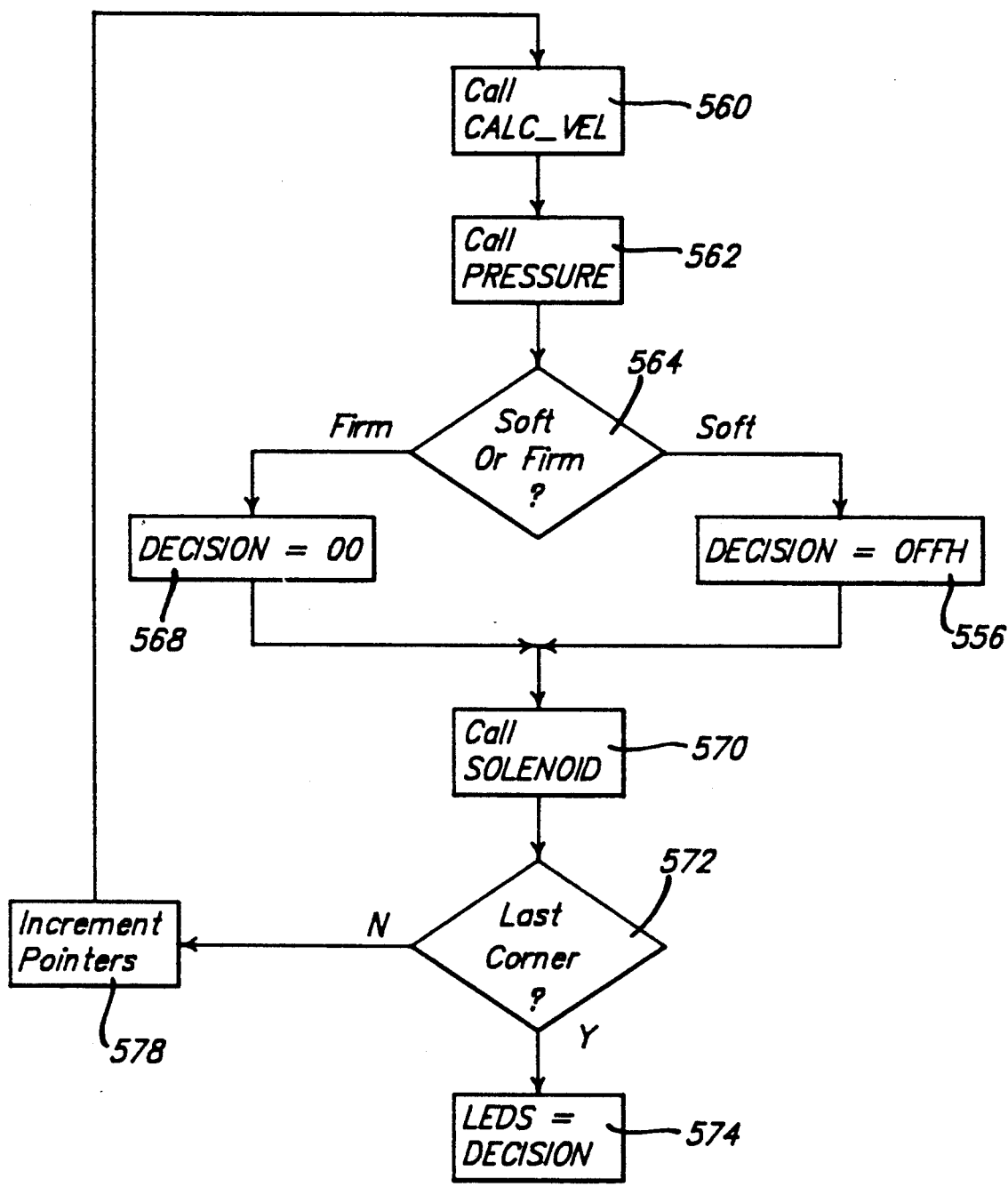
FIG. 14 is a flow chart of the MANUAL portion of the MAIN routine which is used by the microprocessor shown in FIG. 8 for controlling the shock absorber shown in FIG. 2.

The MANUAL portion of the MAIN routine will now be described with a reference to FIG. 14. The first step of the MANUAL routine is step 560 which calls the CALC_VEL routine. After executing step 560, the microprocessor 374 executes step 562 in which the PRESSURE routine is called. After executing step 562, the microprocessor 374 executes step 564 which determines whether the mode select switch 32 has been set to provide either a firm or soft compression and rebound stroke. If the microprocessor 374 determines at step 564 that the mode select switch 32 has been set to provide a soft compression and rebound stroke, the microprocessor 374 executes step 566 which sets the value of DECISION equal to OFFH which indicates that the shock absorber 10 is to produce a soft compression and rebound stroke. If at step 564 the microprocessor 374 determines the mode select switch 32 is set to generate a firm compression and rebound stroke, the microprocessor 374 executes step 568 which sets a bit pattern of DECISION equal to 00H thereby indicating that a firm compression and rebound stroke is to be generated. After executing either steps 566 or 568, the microprocessor 374 executes step 570 in which the SOLENOID routine is called which provides the proper current to the coils 286 to achieve the desired damping characteristics.

After the SOLENOID routine is executed, the microprocessor 374 executes step 572 which determines whether the shock absorber 10 currently being adjusted is the last shock absorber in the sequence (i.e., the sequence left-front, right-front, left-rear, right-rear). If the shock absorber 10 being evaluated is not the last shock absorber in sequence (i.e., is not the right rear shock absorber), the microprocessor 374 executes step 578 in which the pointers are incremented so that the next shock absorber 10 in the sequence will be evaluated. After executing step 578, the microprocessor 374 then executes step 560 in which CALC_VEL is called as described above.

If at step 572 the last shock absorber 10 in the sequence (i.e., the right rear shock absorber) has been evaluated, the microprocessor 374 executes step 574 in which the LED panel 396 is illuminated to provide an indication of whether a firm or soft compression and rebound stroke is desired for each shock absorber. Step 574 is used generally for development purposes. After executing step 574, the microprocessor 374 executes step 574 which directs the microprocessor 374 to execute step 408 of the MAIN routine described above.

While it will be apparent from the preferred embodiment illustrated herein as well as the objects stated above, it will be appreciated that the present invention is susceptible to modification, variation and change without departing from the scope of the invention. For example, the accelerometers may also be either located within the shock absorbers or mounted externally. Various routines may be used to determine whether the wheels of the automobile are in resonance, and various methods may be used for energizing the solenoid in response to the input signals as well as the desired like characteristics.

What is claimed is:

1. An apparatus for damping the movement of the body of an automobile comprising:
   a shock absorber having a pressure cylinder, said pressure cylinder forming a working chamber having first and second portions operable to store damping fluid;
   first sensor means for determining the difference in pressure between the damping fluid in said first and second portions of said working chamber, said first sensor means operable to generate a first electrical signal in response to the difference in pressure between the damping fluid stored in said first and second portions;
   second sensor means for determining movement of the body of said automobile, said second sensor means operable to generate a second electrical signal in response to the movement of the body of said automobile;
   means for generating an electrical control signal in response to said first and second electrical signals, said means for generating an electrical control signal comprises an electronic control module having a microprocessor operable to receive said first and second electrical signals, said microprocessor being operable to compare the movement of the body of said automobile to a first threshold range, said microprocessor being further operable to generate firm damping during compression of said shock absorber when the movement of the body of said automobile exceeds said first threshold range, said microprocessor operable to generate firm damping during rebound of said shock absorber when the movement of the body of the automobile is below said first threshold range; and
   electrical controllable flow means for regulating the flow of damping fluid between said first and second portions of said working chamber in response to said electrical control signal, said electrical controllable flow means including a plunger operable to generate firm damping during compression and rebound of said shock absorber while maintaining the position of said plunger with respect to said electrical controllable flow means.

2. The apparatus as set forth in claim 1, wherein said first sensor means comprises a pressure sensor having a first surface communicating with the damping fluid stored in said first portion of said working chamber, said pressure sensor further having a second surface communicating with the damping fluid stored in said second portion of said working chamber.

3. The apparatus as set forth in claim 2, wherein said pressure sensor is operable to receive damping fluid from said second portion of said working chamber through said electrical controllable flow means.

4. The apparatus as set forth in claim 3, wherein said pressure sensor is disposed within said pressure cylinder.

5. The apparatus as set forth in claim 2, wherein said pressure sensor is secured to a header, said header being disposed within said pressure cylinder at a position displaced from said electrical controllable flow means.

6. The apparatus as set forth in claim 1, wherein said second sensor means comprises an accelerometer.

7. The apparatus as set forth in claim 6, wherein said accelerometer is disposed within said pressure cylinder.

8. The apparatus set forth in claim 1, wherein said electrical controllable flow means comprises a solenoid, said solenoid operable to regulate the flow of damping fluid between said first and second portions of said working chamber.

9. The apparatus as set forth in claim 8, wherein said shock absorber further comprises a piston assembly disposed between said first and second portions of said working chamber, said piston assembly having a first spring disk for controlling the flow of damping fluid through said pressure cylinder during compression of said shock absorber, said piston assembly having a second spring disk for controlling the flow of damping fluid through said pressure cylinder during rebound of said shock absorber.

10. The apparatus as set forth in claim 9, wherein said piston assembly comprises a plurality of subassemblies which are secured to each other by copper infiltration.

11. The apparatus as set forth in claim 9, wherein said piston assembly has a first flow passage between said first portion of said working chamber and a region in said piston assembly proximate to said second spring disk, said piston assembly further having second flow passage between said second portion of said working chamber and said first spring disk, said plunger operable to control the flow of damping fluid through said first and second flow passages.

12. The apparatus set forth in claim 11, wherein said plunger has a portion with a reduced external radius, the position of said portion of said plunger with said reduced external radius is operable to change the flow of damping fluid through said first and second flow passages.

13. The apparatus as set forth in claim 1, wherein said microprocessor is operable to cause said shock absorber to generate firm damping during compression and rebound of said shock absorber when the discrete fourier transform of said first electrical signal exceeds a predetermined value.

14. The apparatus as set forth in claim 1, wherein said microprocessor is operable to cause said shock absorber to generate firm damping during compression and rebound of said shock absorber when the amplitude of the output of said first sensor means exceeds a threshold value.

15. The apparatus as set forth in claim 1, wherein said microprocessor prevents firm damping during both compression and rebound of said shock absorber when said first electrical signal is within a second threshold range.

16. The apparatus as set forth in claim 1, wherein said microprocessor is operable to sequentially change the damping characteristics of four shock absorbers.

17. The apparatus as set forth in claim 1, wherein said microprocessor is operable to deliver a pulse width modulated signal to said electrical controllable flow means.

18. A method for regulating the flow of damping fluid between first and second portions of the working chamber of a direct acting hydraulic shock absorber, said shock absorber being disposed between the sprung and unsprung portions of a vehicle and having a pressure cylinder, said method comprising the steps of:

sensing the pressure differential between said first and second portions of said working chamber;

sensing the vertical velocity of the sprung portion of said vehicle;

delivering damping fluid to electrical controllable flow means for regulating the flow of damping fluid between said first and second portions of said working chamber, said electrical controllable flow means comprising a plunger operable to be disposed in first and second positions; and regulating the flow of damping fluid between said first and second portions of said working chamber by said electrical controllable flow means in response to the pressure differential between said first and second portions of said working chamber and the vertical velocity of said sprung portion of said vehicle, said step of regulating the flow of damping fluid includes the step of generating firm damping during compression and rebound of said shock absorber when said plunger is disposed in said first position, said step of regulating the flow of damping fluid further includes the steps of comparing the vertical velocity of said sprung portion to a first threshold range, generating firm damping during compression of said shock absorber when the vertical velocity of said sprung portion exceeds said first threshold range, and generating firm damping during rebound of said shock absorber when the vertical velocity of said sprung portion is below said first threshold range.

19. The method of claim 18, wherein said piston assembly has a first flow passage between said first portion of said working chamber and a region in said piston assembly proximate to said second spring disk, said piston assembly further having second flow passage between said second portion of said working chamber and said first spring disk, said plunger being operable to control the flow of damping fluid through said first and second flow passages.

20. The method of claim 19, wherein said shock absorber comprises first spring disk, said step of regulating the flow of damping fluid further comprises the step of applying a biasing force in said first spring disk by said first unloader in response to the pressure of the damping fluid in a first flow passage.

21. The method of claim 20, wherein said shock absorber further comprises a second spring disk, said step of regulating the flow of damping fluid further comprises the step of applying a biasing force on said second spring disk by said second unloader in response to the pressure of damping fluid in a second flow passage.

22. The method of claim 21, wherein said plunger has a reduced external radius portion operable to permit the flow of damping fluid through said first and second flow passages when said plunger is in said second position.

23. The method of claim 18, wherein said step of sensing the pressure differential between said first and second portions of said working chamber comprises the step of recording the output of a pressure sensor in fluid communication with said first and second portions of said working chamber.

24. The method of claim 23, wherein said pressure sensor is operable to receive damping fluid from said second portion of said working chamber through said electrical controllable flow means.

25. The method of claim 23, wherein said pressure sensor is disposed within said pressure cylinder.

26. The method of claim 23, wherein said pressure sensor is secured to a header, said header being disposed within said pressure cylinder at a position displaced from said electrical controllable flow means.

27. The method of claim 23, wherein said step of sensing the vertical velocity of the sprung portion of said vehicle comprises the step of recording the output from an accelerometer.

28. The method of claim 27, wherein said accelerometer is disposed within said pressure cylinder.

29. The method of claim 18, wherein said step of regulating the flow of damping fluid comprises the step of causing said shock absorber to generate firm damping during compression and rebound of said shock absorber when the discrete fourier transform of said differential pressure between said first and second portions of said working chamber exceeds a threshold value.

30. The method of claim 18, wherein said step of regulating the flow of damping fluid comprises the step of causing said shock absorber to generate firm damping during compression and rebound of said shock absorber when the amplitude of the output of said pressure sensor exceeds a threshold value.

31. The method of claim 18, wherein said step of regulating the flow of damping fluid further comprises the step of preventing firm damping during both compression and rebound of said shock absorber when an electrical signal generated in response to said pressure differential between said first and second portions of said working chamber is within a second threshold range.

32. The method of claim 18, wherein said step of regulating the flow of damping fluid comprises the step of delivering a pulse width modulated signal to said electrical controllable flow means.

33. An apparatus for damping the movement of the body of an automobile relative to a wheel of said automobile comprising a shock absorber, said shock absorber having a pressure cylinder with a reciprocating piston disposed therein operable to divide the working chamber formed by said pressure cylinder into first and second portions, said shock absorber comprising:
first valve means for controlling the flow of damping fluid between said first and second portions of said working chamber during compression, said first valve means including
a first spring disk, and
a first unloader operable to apply a biasing force on said first spring disk in response to the pressure of damping fluid acting on said first unloader;
second valve means for controlling the flow of damping fluid between said first and second portions of said working chamber during rebound, said second valve means including
a second spring disk, and
a second unloader operable to apply a biasing force on said second spring disk in response to the pressure of damping fluid acting on said second unloader;
electrical controllable flow means operable to control the actuation of said first and second valve means, said electrical controllable flow means comprising a solenoid having a plunger operable to be displayed in first and second positions, said plunger operable to control the biasing force on said first and second unloaders by selectively limiting the flow of damping fluid between said first unloader and said second unloader;
a first flow path between said first portion of said working chamber and said second valve means through said electrical controllable flow means and said first valve means;
a second flow path between said second portion of said working chamber and said first valve means through said electrically controllable flow means and said second valve means; and
means for controllably actuating said electrical controllable flow means in response to the pressure differential between said first and second portions of said working chamber and the movement of the body of said automobile, said means for controllably actuating said electrical controllable flow means operable to generate firm damping during compression and rebound by displacing said plunger to said first position.

34. The apparatus as set forth in claim 33, further comprising a pressure sensor having a first surface communicating with the damping fluid stored in said first portion of said working chamber, said pressure sensor further having a second surface communicating with the damping fluid stored in said second portion of said working chamber.

35. The apparatus as set forth in claim 34, wherein said pressure sensor is operable to receive damping fluid through said electrical controllable flow means.

36. The apparatus as set forth in claim 35, wherein said pressure sensor is disposed within said pressure cylinder.

37. The apparatus as set forth in claim 36, wherein said pressure sensor is secured to a header, said header being disposed within said pressure cylinder at a position displaced from said electrical controllable flow means.

38. The apparatus as set forth in claim 37, further comprising an accelerometer operable to sense the movement of the body of said automobile.

39. The apparatus as set forth in claim 38, wherein said accelerometer is disposed within said pressure cylinder.

40. The apparatus as set forth in claim 39, wherein said plunger is operable to control the flow of damping fluid through said first and second flow paths.

41. The apparatus as set forth in claim 40, wherein said plunger operable to permit the flow of damping fluid through said first and second flow paths when said plunger is disposed in said second position, said plunger operable to prevent the flow of damping fluid through said first and second flow paths when said plunger is disposed in said first position.

42. The apparatus as set forth in claim 41, wherein said means for controllably actuating said electrical control signal comprises an electronic control module having a microprocessor.

43. The apparatus as set forth in claim 42, wherein said microprocessor is operable to cause said shock absorber to generate firm damping during compression and rebound of said shock absorber when the discrete fourier transform of the output of said pressure sensor exceeds a predetermined value.

44. The apparatus as set forth in claim 43, wherein said microprocessor is operable to cause said shock absorber to generate firm damping during compression and rebound of said shock absorber when the amplitude of the output of said pressure sensor exceeds a threshold value.

45. The apparatus as set forth in claim 44, wherein said microprocessor is operable to compare the movement of the body of said automobile to a first threshold range, said microprocessor being further operable to generate firm damping during compression of said shock absorber when the movement of the body of said automobile exceeds said first threshold range, said microprocessor operable to generate firm damping during rebound of said shock absorber when the movement of the body of the automobile is below said first threshold range.

46. The apparatus as set forth in claim 45, wherein said microprocessor prevents firm damping during both compression and rebound of said shock absorber when said pressure sensor is within a second threshold range.

47. The apparatus as set forth in claim 46, wherein said microprocessor is further operable to sequentially change the damping characteristics of four shock absorbers.

48. The apparatus as set forth in claim 47, wherein said microprocessor being further operable to deliver a pulse width modulated signal to said electrical controllable flow means.

49. A method for regulating the flow of damping fluid through a piston disposed between the first and second portions of the working chamber of the direct acting shock absorber, said shock absorber operable to damp movement of the body of an automobile, said method comprising the steps of:

permitting damping fluid to flow from said second portion of said working chamber through a first flow path to first valve means for controlling the flow of damping fluid during compression, said first valve means including a first spring, and a first unloader operable to supply a biasing force on said first spring disk in response to the pressure of damping fluid acting on said first unloader;

permitting damping fluid to flow from said first portion of said working chamber through a second flow path to second valve means for controlling the flow during rebound, said second valve means including a second spring disk, and a second unloader operable to apply a biasing force on said second spring disk in response to the pressure of damping fluid acting on said second unloader;

recording the output of a first sensor means for determining the difference in pressure between the damping fluid in said first and second portions of said working chamber, said first sensor means operable to generate a first electrical signal in response to the difference in pressure between the damping fluid stored in said first and second portions of said working chamber;

recording the output of a second sensor means for determining the movement of a body of said automobile, said sensor means operable to generate a second electrical signal in response to the movement of the body of said automobile;

generating an electrical control signal in response to said first and second electrical signals; and regulating the flow or damping fluid through said piston by an electrical controllable flow means for regulating the flow of damping fluid through said piston, said electrical controllable flow means comprising a plunger operable to allow damping fluid to flow through said first and second flow paths when said plunger is in a first position, said plunger operable to prevent damping fluid from flowing through said first and second flow paths when said plunger is in a second position, said plunger operable to control the biasing force on said first and second unloaders by controlling the flow of damping fluid to said first unloader through said second unloader and said first flow path during compression as well as controlling the flow of damping fluid to said second unloader through said first unloader and said second flow path during a rebound, said step of regulating the flow of damping fluid including the steps of (a) comparing the vertical velocity of said body to a first threshold range, (b) generating firm damping during compression of said shock absorber when the vertical velocity of said body exceeds said first threshold range, (c) and generating firm damping during rebound of said shock absorber when the vertical velocity of said body is below said first threshold range.

50. The method of claim 49, wherein said first flow path is disposed between said second portion of said working chamber and a region in said piston proximate to said first spring disk, said second flow path is disposed between said first portion of said working chamber and a region proximate to said second spring disk.

51. The method of claim 50, where said step of regulating the flow of damping fluid further comprises the step of applying a biasing force on said first spring disk by said first unloader in response to the pressure of the damping fluid in a first flow path.

52. The method of claim 48, wherein said step of regulating the flow of damping fluid further comprises the step of applying a biasing force on said second spring disk by said second unloader in response to the pressure of damping fluid in a second flow passage.

53. The method of claim 52, wherein said plunger has a portion with a reduced external radius, said step of regulating the flow of damping fluid through said piston comprises the step of locating said reduced external radius proximate to said first and second flow paths to produce soft compression and rebound, and displacing said reduced external radius from said first and second flow paths to produce firm compression and rebound.

54. The method of claim 53, wherein said step of recording the output of said first sensor means comprises the step of recording the output of a pressure sensor in fluid communication with said first and second portions of said working chamber.

55. The method of claim 54, wherein said pressure sensor is operable to receive damping fluid from said second portion of said working chamber through said electrical controllable flow means.

56. The method of claim 55, wherein said pressure sensor is disposed within said pressure cylinder.

57. The method of claim 56, wherein said pressure sensor is secured to a header, said header being disposed within said pressure cylinder at a position displaced from said electrical controllable flow means.

58. The method of claim 57, wherein said step of recording the output of said second sensor means comprises the step of recording the output from an accelerometer.

59. The method of claim 58, wherein said accelerometer is disposed within said pressure cylinder.

60. The method of claim 59, wherein said step of regulating the flow of damping fluid comprises the step of causing said shock absorber to generate firm damping during compression and rebound of said shock absorber when the discrete fourier transform of said differential pressure between said first and second portions of said working chamber exceeds a predetermined value.

61. The method of claim 60, wherein said step of regulating the flow of damping fluid comprises the step of causing said shock absorber to generate firm damping during compression and rebound of said shock absorber when the amplitude of the output of said pressure sensor exceeds a threshold value.

62. The method of claim 56, wherein said step of regulating the flow of damping fluid further comprises the step of preventing firm damping during both compression and rebound of said shock absorber when an electrical signal generated in response to said pressure differential between said first and second portions of said working chamber is within a second threshold range.

63. The method of claim 62, wherein said step of regulating the flow of damping fluid comprises the step of delivering a pulse width modulated signal to said electrical controllable flow means.

* * * * *

UNITED STATES PATENT AND TRADEMARK OFFICE
CERTIFICATE OF CORRECTION

PATENT NO. : 5,016,908

DATED : May 21, 1991

INVENTOR(S) : David S. Athanas, et al

It is certified that error appears in the above-identified patent and that said Letters Patent is hereby corrected as shown below:

Title Page:
Foreign Patent Documents, "WO87/107565" should be --WO87/07565--;
Abstract, Line 9, "electrical" should be --electronic--;
Abstract, Line 12, "the" (1st occurrence) should be --a--;
Col. 3, Line 11, "is" should be --are--;
Col. 3, Line 23, "is" should be --are--;
Col. 7, Line 63, "a" should be --an--;
Col. 8, Line 4, "axially" should be --axial--;
Col. 11, Line 19, "230" should be --230.--;
Col. 12, Line 25, "radial" should be --radially--;
Col. 16, Line 52, "igniting" should be --ignition--;
Col. 17, Line 16, "with" should be --within--;
Col. 27, Line 46, Claim 12, after "apparatus" insert --as--;
Col. 28, Line 55, Claim 20, after "comprises" insert --a--;
Col. 30, Lines 9-10, Claim 33, "displayed" should be --displaced--;
Col. 31, Line 50, Claim 49, "supply" should be --apply--;
Col. 32, Line 6, Claim 49, after "said" insert --second--;
Col. 32, Line 44, Claim 51, "where" should be --wherein--;
Col. 32, Line 49, Claim 52, "48" should be --51--;

UNITED STATES PATENT AND TRADEMARK OFFICE
CERTIFICATE OF CORRECTION

PATENT NO. : 5,016,908

DATED : May 21, 1991

INVENTOR(S) : David S. Athanas, et al

It is certified that error appears in the above-identified patent and that said Letters Patent is hereby corrected as shown below:

Col. 34, Line 9, Claim 62, "56" should be --61--.

Signed and Sealed this

Fifth Day of January, 1993

*Attest:*

DOUGLAS B. COMER

*Attesting Officer*     *Acting Commissioner of Patents and Trademarks*